(12) United States Patent
Markram et al.

(10) Patent No.: US 12,147,904 B2
(45) Date of Patent: Nov. 19, 2024

(54) DISTANCE METRICS AND CLUSTERING IN RECURRENT NEURAL NETWORKS

(71) Applicant: INAIT SA, Lausanne (CH)

(72) Inventors: Henry Markram, Pully (CH); Felix Schürmann, Grens (CH); Fabien Jonathan Delalondre, Geneva (CH); Ran Levi, Aberdeen (GB); Kathryn Hess Bellwald, Aigle (CH); John Rahmon, Lausanne (CH)

(73) Assignee: INAIT SA, Lausanne (CH)

( * ) Notice: Subject to any disclaimer, the term of this patent is extended or adjusted under 35 U.S.C. 154(b) by 0 days.

(21) Appl. No.: 18/167,958

(22) Filed: Feb. 13, 2023

(65) Prior Publication Data
US 2023/0351196 A1    Nov. 2, 2023

Related U.S. Application Data

(63) Continuation of application No. 16/710,176, filed on Dec. 11, 2019, now Pat. No. 11,580,401.

(51) Int. Cl.
| | |
|---|---|
| *G06K 9/62* | (2022.01) |
| *G06F 18/22* | (2023.01) |
| *G06F 18/23* | (2023.01) |
| *G06N 3/082* | (2023.01) |
| *G06N 3/088* | (2023.01) |

(52) U.S. Cl.
CPC ............ *G06N 3/088* (2013.01); *G06F 18/22* (2023.01); *G06F 18/23* (2023.01); *G06N 3/082* (2013.01)

(58) Field of Classification Search
CPC .......... G06N 3/082; G06N 3/04; G06N 3/088; G06N 3/0445; G06N 3/049; G06K 9/6215; G06K 9/6218
See application file for complete search history.

(56) References Cited

U.S. PATENT DOCUMENTS

| | | |
|---|---|---|
| 5,822,742 A | 10/1998 | Alkon et al. |
| 7,321,882 B2 | 1/2008 | Herbert |
| 7,412,426 B2 | 8/2008 | Hercus |
| 8,818,923 B1 | 8/2014 | Hoffmann |

(Continued)

FOREIGN PATENT DOCUMENTS

| | | |
|---|---|---|
| CN | 101669130 | 3/2010 |
| CN | 102859538 | 1/2013 |

(Continued)

OTHER PUBLICATIONS

Abbas et al., "Artificial Intelligence Conquering the next frontier of the digital world," Research Gate, Dec. 17, 2017, 15 pages.

(Continued)

*Primary Examiner* — Duy M Dang
(74) *Attorney, Agent, or Firm* — Fish & Richardson P.C.

(57) ABSTRACT

Distance metrics and clustering in recurrent neural networks. For example, a method includes determining whether topological patterns of activity in a collection of topological patterns occur in a recurrent artificial neural network in response to input of first data into the recurrent artificial neural network, and determining a distance between the first data and either second data or a reference based on the topological patterns of activity that are determined to occur in response to the input of the first data.

18 Claims, 5 Drawing Sheets

(56) References Cited

U.S. PATENT DOCUMENTS

| | | | |
|---|---|---|---|
| 9,336,239 B1 | 5/2016 | Hoffmann et al. | |
| 9,558,442 B2 | 1/2017 | Canoy et al. | |
| 9,785,886 B1 | 10/2017 | Andoni et al. | |
| 9,875,440 B1 | 1/2018 | Lamport | |
| 10,019,506 B1 | 7/2018 | Li et al. | |
| 10,153,806 B1 | 12/2018 | Petre et al. | |
| 10,417,558 B1 | 9/2019 | Bauer et al. | |
| 10,510,000 B1 | 12/2019 | Lamport | |
| 10,628,486 B2 | 4/2020 | Chu et al. | |
| 10,650,047 B2 | 5/2020 | Yanagisawa | |
| 10,885,020 B1 | 1/2021 | Ablitt | |
| 10,922,510 B2 | 2/2021 | Tscherepanow et al. | |
| 11,195,038 B2 | 12/2021 | Nunn et al. | |
| 11,218,498 B2 | 1/2022 | Hajimirsadeghi et al. | |
| 11,250,326 B1 | 2/2022 | Ko et al. | |
| 11,278,413 B1 | 3/2022 | Lang | |
| 11,569,978 B2 | 1/2023 | Hess et al. | |
| 11,580,401 B2 * | 2/2023 | Markram | G06F 18/23 |
| 11,615,285 B2 | 3/2023 | Reimann et al. | |
| 11,651,210 B2 | 5/2023 | Henry et al. | |
| 11,652,603 B2 | 5/2023 | Markram et al. | |
| 11,663,478 B2 | 5/2023 | Markram et al. | |
| 11,797,827 B2 | 10/2023 | Markram et al. | |
| 11,816,553 B2 | 11/2023 | Markram et al. | |
| 11,893,471 B2 | 2/2024 | Markram et al. | |
| 11,972,343 B2 | 4/2024 | Markram et al. | |
| 12,020,157 B2 | 6/2024 | Markram et al. | |
| 2004/0015459 A1 | 1/2004 | Herbert | |
| 2006/0112028 A1 | 5/2006 | Xiao et al. | |
| 2006/0184471 A1 | 8/2006 | Minamino et al. | |
| 2008/0152217 A1 | 6/2008 | Greer | |
| 2009/0006060 A1 | 1/2009 | Rhodes | |
| 2009/0012581 A1 | 1/2009 | Rhodes | |
| 2009/0187736 A1 | 7/2009 | Raichelgauz et al. | |
| 2014/0156901 A1 | 6/2014 | Raichelgauz et al. | |
| 2015/0058352 A1 | 2/2015 | Brand | |
| 2015/0206049 A1 | 7/2015 | Canoy et al. | |
| 2015/0280906 A1 | 10/2015 | Shany et al. | |
| 2015/0310303 A1 | 10/2015 | Andreopoulos et al. | |
| 2015/0347870 A1 | 12/2015 | Andreopoulos et al. | |
| 2015/0363689 A1 | 12/2015 | Henry et al. | |
| 2016/0048756 A1 | 2/2016 | Hall et al. | |
| 2016/0350648 A1 | 12/2016 | Gilad-Bachrach et al. | |
| 2017/0124452 A1 | 5/2017 | Tucker et al. | |
| 2017/0139759 A1 | 5/2017 | Bandara | |
| 2017/0213131 A1 | 7/2017 | Hammond et al. | |
| 2017/0229117 A1 | 8/2017 | Van Der Made et al. | |
| 2017/0249536 A1 | 8/2017 | Hillar et al. | |
| 2018/0005111 A1 | 1/2018 | Chaudhari et al. | |
| 2018/0018553 A1 | 1/2018 | Bach et al. | |
| 2018/0053108 A1 | 2/2018 | Olabiyi et al. | |
| 2018/0053114 A1 | 2/2018 | Adjaoute | |
| 2018/0082171 A1 | 3/2018 | Merity et al. | |
| 2018/0107922 A1 | 4/2018 | Paul et al. | |
| 2018/0136912 A1 | 5/2018 | Venkataramani et al. | |
| 2018/0157973 A1 | 6/2018 | El-Yaniv et al. | |
| 2018/0165547 A1 | 6/2018 | Haung et al. | |
| 2018/0197069 A1 | 7/2018 | Reimann et al. | |
| 2018/0197076 A1 | 7/2018 | Paik et al. | |
| 2018/0247198 A1 | 8/2018 | Vasudevan et al. | |
| 2018/0336453 A1 | 11/2018 | Merity et al. | |
| 2018/0373985 A1 | 12/2018 | Yang et al. | |
| 2019/0012574 A1 | 1/2019 | Anthony et al. | |
| 2019/0036678 A1 | 1/2019 | Ahmed | |
| 2019/0042988 A1 | 2/2019 | Brown et al. | |
| 2019/0050726 A1 | 2/2019 | Azaria et al. | |
| 2019/0122096 A1 | 4/2019 | Husain | |
| 2019/0122140 A1 | 4/2019 | Sen | |
| 2019/0171187 A1 | 6/2019 | Cella et al. | |
| 2019/0171929 A1 | 6/2019 | Abadi et al. | |
| 2019/0197410 A1 | 6/2019 | Berry, II | |
| 2019/0228300 A1 | 7/2019 | Cao et al. | |
| 2019/0244348 A1 | 8/2019 | Buckler et al. | |
| 2019/0266246 A1 | 8/2019 | Wang et al. | |
| 2019/0286074 A1 | 9/2019 | Hoffman | |
| 2019/0304568 A1 | 10/2019 | Wei et al. | |
| 2019/0312898 A1 | 10/2019 | Verma et al. | |
| 2019/0335192 A1 | 10/2019 | Otto et al. | |
| 2019/0354846 A1 | 11/2019 | Mellempudi et al. | |
| 2019/0370647 A1 | 12/2019 | Doshi et al. | |
| 2019/0377976 A1 | 12/2019 | Markram et al. | |
| 2019/0377999 A1 | 12/2019 | Markram et al. | |
| 2019/0378000 A1 | 12/2019 | Markram et al. | |
| 2019/0378007 A1 | 12/2019 | Markram et al. | |
| 2019/0378008 A1 | 12/2019 | Markram et al. | |
| 2019/0392303 A1 | 12/2019 | Cherubini et al. | |
| 2020/0012927 A1 | 1/2020 | Raichelgauz et al. | |
| 2020/0126126 A1 | 4/2020 | Briancon et al. | |
| 2020/0134016 A1 | 4/2020 | Cao et al. | |
| 2020/0184055 A1 | 6/2020 | Storm et al. | |
| 2020/0210764 A1 | 7/2020 | Hamedi et al. | |
| 2020/0242444 A1 | 7/2020 | Zhang et al. | |
| 2020/0285944 A1 | 9/2020 | Lee et al. | |
| 2020/0302297 A1 | 9/2020 | Jaganathan et al. | |
| 2020/0304284 A1 | 9/2020 | Markram et al. | |
| 2020/0304285 A1 | 9/2020 | Hess et al. | |
| 2020/0310400 A1 | 10/2020 | Jha et al. | |
| 2020/0367810 A1 | 11/2020 | Shouldice et al. | |
| 2020/0380335 A1 | 12/2020 | Neznal | |
| 2020/0402497 A1 | 12/2020 | Semonov et al. | |
| 2021/0049441 A1 | 2/2021 | Bronstein | |
| 2021/0049446 A1 | 2/2021 | Gurumurthi et al. | |
| 2021/0058547 A1 | 2/2021 | Puttamalla et al. | |
| 2021/0097578 A1 | 4/2021 | Holmes et al. | |
| 2021/0110115 A1 | 4/2021 | Hermann et al. | |
| 2021/0182604 A1 | 6/2021 | Anthony et al. | |
| 2021/0182653 A1 | 6/2021 | Markram et al. | |
| 2021/0182654 A1 | 6/2021 | Markram et al. | |
| 2021/0182655 A1 | 6/2021 | Markram et al. | |
| 2021/0182657 A1 | 6/2021 | Markram et al. | |
| 2021/0182681 A1 | 6/2021 | Markram et al. | |
| 2021/0271319 A1 | 9/2021 | Lussier et al. | |
| 2021/0338007 A1 | 11/2021 | Choi et al. | |
| 2021/0398621 A1 | 12/2021 | Stojevic et al. | |
| 2022/0005332 A1 | 1/2022 | Metzler et al. | |
| 2022/0012877 A1 | 1/2022 | Buckler et al. | |
| 2022/0147760 A1 | 5/2022 | Dutta et al. | |
| 2022/0148454 A1 | 5/2022 | Jaramaz et al. | |
| 2022/0157436 A1 | 5/2022 | Harley et al. | |
| 2022/0187847 A1 | 6/2022 | Cella et al. | |
| 2022/0197306 A1 | 6/2022 | Cella et al. | |
| 2022/0261593 A1 | 8/2022 | Yu et al. | |
| 2022/0269346 A1 | 8/2022 | Hussami et al. | |
| 2023/0019839 A1 | 1/2023 | Markram | |
| 2023/0024925 A1 | 1/2023 | Markram et al. | |
| 2023/0028511 A1 | 1/2023 | Markram et al. | |
| 2023/0085384 A1 | 3/2023 | Lütgehetmann et al. | |
| 2023/0171086 A1 | 6/2023 | Hess et al. | |
| 2023/0297808 A1 | 9/2023 | Reimann et al. | |
| 2023/0316077 A1 | 10/2023 | Markram et al. | |
| 2023/0370244 A1 | 11/2023 | Markram et al. | |
| 2024/0046077 A1 | 2/2024 | Markram et al. | |
| 2024/0111994 A1 | 4/2024 | Markram et al. | |
| 2024/0176985 A1 | 5/2024 | Markram et al. | |

FOREIGN PATENT DOCUMENTS

| | | |
|---|---|---|
| CN | 103988203 | 8/2014 |
| CN | 104318304 | 1/2015 |
| CN | 104335219 | 2/2015 |
| CN | 105095966 | 11/2015 |
| CN | 106156845 | 11/2016 |
| CN | 107247989 | 10/2017 |
| CN | 107423814 | 12/2017 |
| CN | 107844830 | 3/2018 |
| CN | 108348750 | 7/2018 |
| CN | 112567387 | 3/2021 |
| CN | 112567388 | 3/2021 |
| CN | 112567389 | 3/2021 |
| CN | 112567390 | 3/2021 |
| CN | 112585621 | 3/2021 |
| EP | 1283496 | 2/2003 |
| EP | 3340121 | 6/2018 |
| EP | 3803699 | 4/2021 |

(56) References Cited

FOREIGN PATENT DOCUMENTS

| | | |
|---|---|---|
| EP | 3803705 | 4/2021 |
| EP | 3803706 | 4/2021 |
| EP | 3803707 | 4/2021 |
| EP | 3803708 | 4/2021 |
| KR | 20120123698 | 11/2012 |
| KR | 20210008417 | 1/2021 |
| KR | 20210008418 | 1/2021 |
| KR | 20210008419 | 1/2021 |
| KR | 20210008858 | 1/2021 |
| KR | 20210010894 | 1/2021 |
| TW | 201437945 | 10/2014 |
| TW | 201535277 | 9/2015 |
| TW | 201725519 | 7/2017 |
| TW | I608429 | 12/2017 |
| TW | 201928789 | 7/2019 |
| TW | 201935326 | 9/2019 |
| TW | 201937392 | 9/2019 |
| WO | WO 2007/137047 | 11/2007 |
| WO | WO 2016/206765 | 12/2016 |
| WO | WO 2017/083399 | 5/2017 |
| WO | WO 2017/197375 | 11/2017 |
| WO | WO 2017/200971 | 11/2017 |
| WO | WO 2018/058426 | 4/2018 |
| WO | WO 2018/175400 | 9/2018 |
| WO | WO 2019/238483 | 12/2019 |
| WO | WO 2019/238512 | 12/2019 |
| WO | WO 2019/238513 | 12/2019 |
| WO | WO 2019/238522 | 12/2019 |
| WO | WO 2019/238523 | 12/2019 |
| WO | WO 2020/187676 | 9/2020 |
| WO | WO 2020/187694 | 9/2020 |
| WO | WO 2021/116071 | 6/2021 |
| WO | WO 2021/116075 | 6/2021 |
| WO | WO 2021/116140 | 6/2021 |
| WO | WO 2021/116147 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Achard et al., "A Resilient, Low-Frequency, Small-World Human Brain Functional Network with Highly Connected Association Cortical Hubs," Journal of Neuroscience, Jan. 4, 2006, 26(1):63-72.
Aharoni et al. "Eigenvalues and homology of flag complexes and vector representations of graphs," Geom. Funct. Anal., Jul. 28, 2005, 15:555-566.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics), " Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Andersen et al., "Overlapping clusters for distributed computation," In Proceedings of the Fifth ACM International Conference on Web Search and Data Mining, Feb. 8, 2012, 9 pages.
Angeli, "Symmetric functions for fast image retrieval with persistent homology," Math Meth Appl Sci., Apr. 24, 2018, 41:9567-9577.
Antonopoulos et al., "Evaluating performance of neural codes in neural communication networks," Neural Networks, Sep. 24, 2018, pp. 1-17.
Arai et al., "The Effects of Theta Precession on Spatial Learning and Simplicial Complex Dynamics in a Topological Model of the Hippocampal Spatial Map," PLOS Computational Biology, Jun. 19, 2014, 10(6): r1003651, 14 pages.

Astrivis [online], "Demo Scan Church Dec. 2016," Dec. 2, 2016, retrieved on Nov. 27, 2022, retrieved from URL <https://www.youtube.com/watch?v=xCgQ4aaB1Go>, 2 pages [Video Submission].
Bahraini et al., "Topological pattern selection in recurrent networks," Neural Networks, Feb. 9, 2012, 31:22-32.
Baker et al., "Designing neural network architectures using reinforcement learning," arXiv preprint, arXiv:1611.02167, Nov. 7, 2016, 18 pages.
Bale et al., "Efficient population coding of naturalistic whisker motion in the ventro- posterior medial thalamus based on precise spike timing, " Front. Neural Circuits, Sep. 25, 2015, 9: 1-14.
Baptiste-Bardin et al., "Topological exploration of artificial neuronal network dynamics," Network Neuroscience, Jan. 24, 2019, pp. 1-28.
Baskararaja et al., "Subgraph matching using graph neural network," Journal of Intelligent Learning Systems and Applications, Nov. 28, 2012, 4(04):274-278.
Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Bassett et al., "Dynamic reconfiguration of human brain networks during learning," PNAS, Apr. 18, 2011, 108(18):7641-7646.
Bassett et al., "Network Neuroscience," Network Neuroscience, Nat. Neurosci., Mar. 20, 2017, 20:353-364.
Baudot et al., "Topological Information Data Analysis," Entropy, Sep. 2019, 21:1-38.
Bauer et al., "Clear and Compress: Computing Persistent Homology in Chunks," Topological Methods in Data Analysis and Visualization III., 2014, pp. 103-117.
Bauer et al., "PHAT—Persistent Homology Algorithms Toolbox," J. Symb. Comput., Jan. 1, 2017, 78: 76-90.
Bauer et al., "Real-time ultra-low power ECG anomaly detection using an event- driven neuromorphic processor," IEEE transactions on biomedical circuits and systems, Nov. 11, 2019, 13(6):1575-82.
Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Blanco et al., "A genetic algorithm to obtain the optimal recurrent neural network," International Journal of Approximate Reasoning, Jan. 2000, 23(1):67-83.
Brody et al., "Correlations without synchrony," Neural Comput. 11, Oct. 1, 1999, 11:1537-1551.
Brown et al., "Structure of the Afferent Terminals in Terminal Ganglion of a Cricket and Persistent Homology," PLOS One, May 23, 2012, 7(5): e37278.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Cai et al., "Path-level network transformation for efficient architecture search," In International Conference on Machine Learning, Jul. 3, 2018, PMLR, 10 pages.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," PLoS computational biology, Aug. 19, 2016, 12(8): e1005078, 23 pages.
Chella et al., "Representational Issues in the Debate on the Standard Model of the Mind, "Association for the Advancement of Artificial Intelligence, Nov. 12, 2017, pp. 1-6.
Chen et al., "Neural Representation of Spatial Topology in the Rodent Hippocampus," Neural Computation, Jan. 2014, 26(1):1-39.

(56) References Cited

OTHER PUBLICATIONS

Chklovskii et al., "Cortical rewiring and information storage," Nature, Oct. 14, 2004, 431:782-788.

Choi et al., "A Survey of Binary Similarity and distance measures," Systemic, Cybernetics, and Informatics, Jan. 8, 2010, 8:43-48.

Choi et al., "Abnormal metabolic connectivity in the pilocarpine-induced epilepsy rat model: A multiscale network analysis based on persistent homology," NeuroImage, Oct. 1, 2014, 99:226-236.

Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.

Chowdhury et al., "Path homologies of deep feedforward networks," Arxiv, Oct. 16, 2019, pp. 1-6.

Chung et al., "Persistence Diagrams of Cortical Surface Data," Information Processing in Medical Imaging, 2009, pp. 386-397.

Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.

Collins, "The case for emulating insect brains using anatomical "wiring diagrams" equipped with biophysical models of neuronal activity," Biological cybernetics, Dec. 1, 2019, 113: 465-75.

Cormen et al., "Introduction to Algorithms," Copyright 2001 by The Massachusetts Institute of Technology, 984 pages.

Courtney et al., "Dense Power-law Networks and Simplicial Complexes," ArXiv, Apr. 23, 2018, pp. 1-16.

Crawford et al., "A theory on the role of $\pi$-electrons of docosahexaenoic acid in brain function: The six methylene-interrupted double bonds and the precision of neural signaling," Oilseeds & fats Crops and Lipids, May 21, 2018, pp. 1-14.

Crossley et al., "Cognitive relevance of the community structure of the human brain functional coactivation network," PNAS, Jun. 24, 2013, 110(28):11583-11588.

Curto et al., "Cell groups reveal structure of stimulus space," Plos Comput. Biol., Oct. 2008, 4(10): e100205.

Curto, "Relating network connectivity to dynamics: opportunities and challenges for theoretical neuroscience," Current Opinion in Neurobiology, Oct. 1, 2019, 58:11-20.

Curto, "What can Topology tell us About the Neural Code?" The American Mathematical Society, Jan. 2017, 54(1):63-78.

Dabaghian et al., "A topological paradigm for hippocampal spatial map formation using persistent homology," Plos Comput. Biol., Aug. 2012, 8(8): e1002581.

Dabaghian et al., "Reconceiving the hippocampal map as a topological template," Elife, Aug. 20, 2014, 3: e03476.

Davydov et al., "Neural Network Structures: Current and Future States," Research Gate, Feb. 2, 2018, pp. 1-6.

DeCharms et al., "Primary cortical representation of sounds by the coordination of action-potential timing," Nature, Jun. 13, 1996, 381(6583):610-613.

Djurfeldt et al., "Efficient generation of connectivity in neuronal networks from simulator-independent descriptions," Frontiers in Neuroinformatics, Mar. 28, 2014, 8(43):1-11.

Dlotko [online], "Directed clique topology," (slides are titled "Directed Complexes"), presented at BIRS workshop, video from 17w5043: Topological Methods in Brain Network Analysis, May 11, 2017, retrieved from < http://www.birs.ca/events/2017/5-day-workshops/17w5043/videos/watch/201705111127-Dlotko.html>, retrieved on Jul. 26, 2022, 26 pages.

Dlotko et al, "Topological analysis of the connectome of digital reconstructions of neural microcircuits," ArXiv, a working paper, Jan. 7, 2016, 1-28 pages.

Doborjeh et al., "Spiking Neural Network Modelling Approach Reveals How Mindfulness Training Rewires the Brain, " Scientific Reports, Apr. 23, 2019, 9:1-15.

docs.opencv.org [online], "Camera Calibration and 3D Reconstruction," retrieved on Oct. 5, 2022, retrieved from URL <https://docs.opencv.org/4.4.0/d9/doc/group_calib3d.html#ga549c2075fac14829ff4a58bc931c033d)>, 78 pages.

docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.

Dongjiang et al., "DXSLAM: A Robust and Efficient Visual SLAM System with Deep Features," ArXiv, Aug. 12, 2020, 8 pages.

Drakesmith et al., "Overcoming the effects of false positives and threshold bias in graph theoretical analyses of neuroimaging data," NeuroImage, Sep. 2015, 118:313-333.

Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.

Ellis et al., "Describing High-Order Statistical Dependence Using "Concurrence Topology," With Application to Functional MRI Brain Data," Homology, Homotopy and Applications, 2014, 16(1):245-264.

Engel et al., "Temporal binding and the neural correlates of sensory awareness," Trends Cogn. Sci., Jan. 1, 2001, 5: 16-25.

Erdos and Renyi, "On random graphs, I," Math. Debrecen., 1959, 6:290-297.

Erdős et al., "On the evolution of random graphs," Publ. Math. Inst. Hung. Acad. Sci., Jan. 1960, 17-60.

Extended European Search Report in European Appln. No. 17174314.9, dated Dec. 14, 2017, 11 pages.

Extended European Search Report in European Appln. No. 17174316.4, dated Dec. 14, 2017, 12 pages.

Extended European Search Report in European Appln. No. 17174317.2, dated Dec. 14, 2017, 12 pages.

Fan et al., "A Brief History of Simulation Neuroscience," Front. Neuroinform., May 7, 2019, 13:1-28.

Feldbrugge et al., "Stochastic homology of Gaussian vs. non-Gaussian random fields: graphs towards Betti numbers and persistence diagrams," Journal of Cosmology and Astroparticle Physics, Sep. 24, 2019, 49 pages.

Feng et al., "Persistent Homology of Geospatial Data: A Case Study with Voting," Jan. 30, 2019, pp. 1-29.

Garcia et al., "Reconfigurations within resonating communities of brain regions following TMS reveal different scales of processing," BioRxiv, Jan. 9, 2020, pp. 1-39.

Garcia et al., "Unsupervised classification of neural spikes with a hybrid multilayer artificial neural network," Journal of Neuroscience Methods, 1998, 82:59-73.

Garrison et al., "The (in)stability of functional brain network measures across thresholds," NeuroImage, Sep. 2015, 118:651-661.

Ghosh et al., "Design and Construction of a Brain-like computer: A New class of Frequency-Fractal Computing Using Wireless Communication in a Supramolecular Organic, Inorganic System," Information, 2014, 5, 28-100.

Ginestet et al., "Brain Network Analysis: Separating Cost from Topology Using Cost-Integration, " PLOS One, Jul. 28, 2018, 2011, 6(7): e21570.

Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.

Github.com [online], "facebookresearch/detectron2," 2019, retrieved on Oct. 5, 2022, retrieved from URL <https://github.com/facebookresearch/detectron2>, 4 pages.

Giusti et al., "Clique topology reveals intrinsic geometric structure in neural correlations," Proc. Natl. Acad. Sci. U.S.A., Apr. 28, 2015, 112:13455-13460.

Giusti et al., "Two's company, three (or more) is a simplex," Journal of computational neuroscience, Aug. 2016, 41(1):1-14.

Gleeson et al., "Open Source Brain: A Collaborative Resource for Visualizing, Analyzing, Simulating, and Developing Standardized Models of Neurons and Circuits, " Neuron, Aug. 7, 2019, 103(3):395-411.e5.

Gong, "Evolution to a small-world network with chaotic units," Europhysics Letters (EPL), Jul. 15, 2004, 67:328-333.

Goodman et al., "Brian: a simulator for spiking neural networks in python," Frontiers in Neuroinformatics, Sep. 30, 2008, 2(5):1-10.

Graves, "Adaptive computation time for recurrent neural networks," ar Xiv preprint arXiv: 1603.08983, Mar. 29, 2016, 19 pages.

(56) References Cited

OTHER PUBLICATIONS

Gripon et al., "Sparse Neural Networks with Large Learning Diversity," IEEE Transactions on Neural Networks, Jul. 2011, 22(7):1087-1096.

Gros et al., "Semantic learning in autonomously active recurrent neural networks," Logic Journal of IGPL, Oct. 1, 2010, 18(5):686-704.

Gros, "Cognitive computation with autonomously active neural networks: an emerging field," Cognitive Computation, Mar. 2009, 1(1):77-90.

Gros, "Neural networks with transient state dynamics," New Journal of Physics, Apr. 30, 2007, 9(4):109, 21 pages.

Gros, "Self-sustained thought processes in a dense associative network," In Annual Conference on Artificial Intelligence, Sep. 11, 2005, Springer, Berlin, Heidelberg, 14 pages.

Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.

Guerreno, "The sleep onset transition: a connectivity investigation built on EEG source localization," University of Zurich, Facult of Science, Aug. 6, 2018, pp. 1-292.

Harris et al. "The neocortical circuit: themes and variations," Nat. Neurosci., Jan. 27, 2015, 18:170-181.

Hastings et al., "Challenges in the analysis of complex systems: introduction and overview," The European Physical Journal Special Topics, Dec. 28, 2017, 226:3185-3197.

Hatcher, "Algebraic Topology," Cambridge University Press, Feb. 2002, 556 pages.

Haun et al., "Conscious Perception as Integrated Information Patterns in Human Electrocorticography," eNeuro: Cognition and Behavior, Sep. 19, 2017, 4:2-18.

Hebb, "The Organization of Behavior: A Neuropsychological Theory," New York, NY: Wiley & Sons, 1949, pp. 1-365.

Holtmaat et al., "Experience-dependent structural synaptic plasticity in the mammalian brain," Nat. Rev. Neurosci., Sep. 10, 2009, 10:647-658.

Hu et al., "Local paths to global coherence: cutting networks down to size," Phys. Rev. E, Mar. 10, 2014, 89: 1-16.

Ibanze-Marcelo et al., "Topology highlights mesoscopic functional equivalence between imagery and perception: The case of hypnotizability," NeuroImage, Jun. 19, 2019, 437-449.

Ignacio et al., "Classification of Single-lead Electrocardiograms: TDA Informed Machine Learning," ArXiv, Nov. 25, 2019, pp. 1-6.

Ignacio et al., "Tracing patterns and shapes in remittance and migration networks via persistent homology," EPJ Data Science, Jan. 5, 2019, 8:1-25.

International Preliminary Report on Patentability in International Appln. No. PCT/EP2020/056588, dated Sep. 30, 2021, 8 pages.
International Preliminary Report on Patentability in International Appln. No. PCT/EP2019/064593, dated Dec. 24, 2020, 11 pages.
International Preliminary Report on Patentability in International Appln. No. PCT/EP2019/064740, dated Dec. 24, 2020, 11 pages.
International Preliminary Report on Patentability in International Appln. No. PCT/EP2019/064741, dated Dec. 24, 2020, 9 pages.
International Preliminary Report on Patentability in International Appln. No. PCT/EP2019/064773, dated Dec. 24, 2020, 11 pages.
International Preliminary Report on Patentability in International Appln. No. PCT/EP2019/064776, dated Dec. 24, 2020, 11 pages.
International Preliminary Report on Patentability in International Appln. No. PCT/EP2020/056686, dated Sep. 30, 2021, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Preliminary Report on Patentability in International Appln. No. PCT/EP2020/085750, mailed on Jun. 23, 2022, 8 pages.
International Preliminary Report on Patentability in International Appln. No. PCT/EP2020/085754, mailed Jun. 23, 2022, 12 pages.
International Preliminary Report on Patentability in International Appln. No. PCT/EP2020/085762, mailed on Jun. 23, 2022, 7 pages.
International Search Report and Written Opinion in International Appln. No. PCT/EP2019/064593, dated Sep. 6, 2019, 18 pages.
International Search Report and Written Opinion in International Appln. No. PCT/EP2019/064740, dated Sep. 6, 2019, 18 pages.
International Search Report and Written Opinion in International Appln. No. PCT/EP2019/064741, dated Sep. 6, 2019, 16 pages.
International Search Report and Written Opinion in International Appln. No. PCT/EP2019/064773, dated Sep. 6, 2019, 17 pages.
International Search Report and Written Opinion in International Appln. No. PCT/EP2019/064776, dated Sep. 6, 2019, 17 pages.
International Search Report and Written Opinion in International Appln. No. PCT/EP2020/056588, dated May 26, 2020, 12 pages.
International Search Report and Written Opinion in International Appln. No. PCT/EP2020/056686, dated May 26, 2020, 13 pages.
International Search Report and Written Opinion in International Appln. No. PCT/EP2020/085007, dated Mar. 24, 2021, 10 pages.
International Search Report and Written Opinion in International Appln. No. PCT/EP2020/085016, dated Mar. 24, 2021, 18 pages.
International Search Report and Written Opinion in International Appln. No. PCT/EP2020/085169, dated Mar. 18, 2021, 15 pages.
International Search Report and Written Opinion in International Appln. No. PCT/EP2020/085200, dated Apr. 9, 2021, 15 pages.
International Search Report and Written Opinion in International Appln. No. PCT/EP2020/085434, dated Mar. 24, 2021, 16 pages.
International Search Report and Written Opinion in International Appln. No. PCT/EP2020/085716, dated Mar. 25, 2021, 18 pages.
International Search Report and Written Opinion in International Appln. No. PCT/EP2020/085716, mailed on Mar. 25, 2021, 13 pages.
International Search Report and Written Opinion in International Appln. No. PCT/EP2020/085750, mailed on Apr. 6, 2021, 10 pages.
International Search Report and Written Opinion in International Appln. No. PCT/EP2020/085754, mailed Apr. 6, 2021, 14 pages.
International Search Report and Written Opinion in International Appln. No. PCT/EP2020/085762, mailed on Apr. 6, 2021, 9 pages.
International Search Report and Written Opinion in International Appln. No. PCT/EP2022/073852, mailed on Dec. 9, 2022, 18 pages.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.
Jozefowicz et al., "An Empirical Exploration of Recurrent Network Architectures," Proceedings of the 32nd International Conference on Machine Learning, 2015, 37:1-9.
Judge, "Prefix "Re-Cognition" as prelude to fixing sustainability— "pro" vs. "con"? Speculative review of missing emphasis potentially vital for psychosocial balance," Research Gate, Jul. 16, 2017, pp. 1-22.
Kahle, "Sharp vanishing thresholds for cohomology of random flag complexes," *Ann. of Math.*, May 2014, 179(3):1085-1107.
Kanari et al., "A Topological Representation of Branching Neuronal Morphologies," Neuroinformatics, Oct. 3, 2017, 11 pages.
Kanari et al., "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.

(56) References Cited

OTHER PUBLICATIONS

Khalid et al., "Tracing the evolution of multi-scale functional networks in a mouse model of depression using persistent brain network homology," NeuroImage, Nov. 1, 2014, 101:351-363.

Kim et al., Morphological brain network assessed using graph theory and network filtration in deaf adults, Hearing Research, Sep. 2014, 315:88-98.

Knoblauch et al., "Memory capacities for synaptic and structural plasticity," Neural Comput., Feb. 2010, 22:289-341.

Kulakov, "Features of a Simple Psychophysiological Reaction," Human Physiology, Jun. 15, 2017, 44:412-417.

Kumarashinghe, "Deep learning and deep knowledge representation in Spiking Neural Networks for Brain-Computer Interface, "Neural Networks, Sep. 20, 2019, 121:169-185.

Kumbhar et al., "CoreNeuron: An Optimized Compute Engine for the NEURON Simulator," Frontiers in Neuroinformatics, Sep. 4, 2019, pp. 1-27.

Kvam, "A geometric framework for modeling dynamic decisions among arbitrarily many alternatives," Journal of Mathematical Psychology, Aug. 1, 2019, 91:14-37.

Langer et al., "The Problem of Thresholding in Small-World Network Analysis," PLOS One, Jan. 3, 2013, 8(1):e53199.

Latora et al., "Efficient behavior of small-world networks," Phys. Rev. Lett., Oct. 17, 2001, 87:1-4.

Le Be et al., "Spontaneous and evoked synaptic rewiring in the neonatal neocortex," Proc. Natl. Acad. Sci. U.S.A., Aug. 29, 2006, 103:13214-13219.

Lee et al., "Discriminative persistent homology of brain networks," 2011 IEEE International Symposium on Biomedical Imaging: From Nano to Macro, Mar. 30, 2011, pp. 841-844.

Lee et al., "Detecting highly overlapping community structure by greedy clique expansion," arXiv preprint arXiv:1002.1827, Feb. 9, 2010, 10 pages.

Lena et al., "Deep spatio-temporal architectures and learning for protein structure prediction," Advances in neural information processing systems, 2012, 25, 9 pages.

Levi, "A short course on Algebraic topology geared towards applications to Neuroscience," University of Aberdeen, Jul. 18, 2017, pp. 1-14.

Li et al., "Ternary weight networks," arXiv preprint arXiv:1605.04711, May 16, 2016, 5 pages.

Liang et al., "Interpretable Structure-Evolving LSTM," 2017 IEEE Conference on Computervision and Pattern Recognition (CVPR), 2017, pp. 2175-2184.

Lin et al., "Organizing principles of real-time memory encoding: neural clique assemblies and universal neural codes," TRENDS in Neurosciences, Jan. 2006, 29(1):48-57.

Luccioli et al., "Modeling driver cells in developing neural networks," PLOS Computational Biology, Nov. 2, 2018, pp. 1-31.

Lucky Robot [online], "ORB SLAM3: AR demo," Feb. 23, 2021, retrieved on Nov. 27, 2022, retrieved from URL <https://www.youtube.com/watch?v=c1ExX_IA5tM>, 2 pages [Video Submission].

Luczak et al., "Packetbased communication in the cortex," Nat. Rev. Neurosci., Oct. 28, 2015, 16:745-755.

Ludermir et al., "An optimization methodology for neural network weights and architectures," IEEE Transactions on Neural Networks, Nov. 13, 2006, 17(6):1452-9.

Lutgehetmann et al., "Computing Persistent Homology of Directed Flag Complexes," Algorithms, Jan. 7, 2020, 1:1-18.

Lynn et al., "The physics of brain network structure, function, and control," Nature Reviews, May 27, 2019, 1:318-332.

Mardones, "Persistence Steenrod modules," ArXiv Mathematics, Dec. 12, 2018, pp. 1-10.

Maria, "Algorithms and data structures in computational topology" (Doctoral dissertation, Université Nice Sophia Antipolis), Oct. 28, 2014, 205 pages.

Markram et al., "Reconstruction and simulation of neocortical microcircuitry," Cell, Oct. 8, 2015, 163:456-492.

Masulli et al., "Dynamics of evolving feed-forward neural networks and their topological invariants," Network and Parallel Computing, Aug. 13, 2016, pp. 99-106.

Masulli et al., "Algebro-topological invariants in network theory, " Int. J. Complex Systems in Science, Sep. 2015, 5(1):13-17.

Masulli et al., "The topology of the directed clique complex as a network invariant," SpringerPlus, Dec. 2016, 5(1):1-2.

mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.

McCoss, "Agency of Life, Entropic Gravity and Phenomena Attributed to Dark Matter," Journal of Quantum Information Science, Jun. 15, 2017, 7:67-75.

McCoss, "Lithium Quantum Consciousness," Journal of Quantum Information Science, Nov. 8, 2017, 7:125-139.

Medaglia et al., "Cognitive Network Neuroscience," Journal of Cognitive Neuroscience, Aug. 1, 2015, 27(8):1471-1491.

Mehta, "Storing and retrieving long-term memories: cooperation and competition in synaptic dynamics," Advances in Physics: X, Jul. 19, 2018, 3:756-790.

Meyer et al., "Cell type-specific thalamic innervation in a column of rat vibrissal cortex," Cereb. Cortex, Jun. 9, 2010, 20: 2287-2303.

Millán et al., "Complex Network Geometry and Frustrated Synchronization," Scientific Reports, Jul. 2, 2018, 8:1-10.

Millan et al., "Synchronization in network geometries with finite spectral dimension," ArXiv, Jan. 31, 2019, pp. 1-15.

Miller et al., "Visual stimuli recruit intrinsically generated cortical ensembles," Proc. Natl. Acad. Sci. U.S.A., Sep. 8, 2014, pp. E4053-E4061.

Milo et al., "Network Motifs: Simple Building Blocks of Complex Networks," Science, Oct. 25, 2002, 298(5594):824-827.

Minkovich et al. "Programming time-multiplexed reconfigurable hardware using a scalable neuromorphic compiler," IEEE transactions on neural networks and learning systems, Apr. 11, 2012, 23(6):889-901.

Miura et al., "Sparse Parallel Algorithms for Recognizing Touch Topology on Curved Interactive Screens, " IEEE Access, Jul. 31, 2017, 5:14889-14897.

Muller et al., "Neocortical plasticity: an unsupervised cake but no free lunch," 33rd Conference on Neural Information Processing Systems, Vancouver, Canada, Nov. 2019, 6 pages.

Munkres, "Elements of Algebraic Topology," Massachusetts Institute of Technology, 1984, Addison-Wesley Publishing Company, 233 pages.

Mur-Artal et al., "ORB-SLAM2: an Open-Source SLAM System for Monocular, Stereo and RGB-D Cameras," IEEE Transactions on Robotics, Oct. 5, 2015, 31(5):1147-1163.

Nolte, "Cortical reliability amid noise and chaos," Nature Communications, Aug. 22, 2019, 10:1-15.

Norton, "Dynamics of Reaction-Diffusion Oscillators in Star and other Networks with Cyclic Symmetries Exhibiting Multiple Clusters," Physical Review Letters, Oct. 4, 2019, 123: 1-6.

Office Action in Korean Appln. No. 2020/7035845, dated Feb. 16, 2022, 9 pages (with English translation).

Office Action in Korean Appln. No. 2020-7035843, dated Jan. 27, 2022, 9 pages (with English translation).

Office Action in Korean Appln. No. 2020-7035844, dated Feb. 17, 2022, 6 pages (with English translation).

Office Action in Korean Appln. No. 2020-7035846, dated Feb. 15, 2022, 6 pages (with English translation).

Office Action in Korean Appln. No. 2020-7035847, dated Aug. 10, 2022, 5 pages (with English translation).

Office Action in Korean Appln. No. 2020-7035847, dated Feb. 15, 2022, 11 pages (with English translation).

Office Action in Taiwanese Appln. No. 108119813, dated Jun. 29, 2020, 17 pages (with machine translation).

Office Action in Taiwanese Appln. No. 108119813, dated May 19, 2021, 8 pages (with machine translation).

Office Action in Taiwanese Appln. No. 109143238, dated Dec. 1, 2021, 18 pages (with machine translation).

Office Action in Taiwanese Appln. No. 109143239, dated Nov. 29, 2021, 17 pages (with machine translation).

(56) References Cited

OTHER PUBLICATIONS

Office Action in Taiwanese Appln. No. 109143240, dated Dec. 24, 2021, 13 pages (with machine translation).
Office Action in Taiwanese Appln. No. 109143242, dated Nov. 26, 2021, 3 pages (with machine translation).
Office Action in Taiwanese Appln. No. 109143863, dated Mar. 1, 2022, 11 pages (with machine translation).
Office Action in Taiwanese Appln. No. 10943863, dated Mar. 1, 2022, 13 pages (with machine translation).
Office Action in U.S. Appl. No. 15/864,146, dated Dec. 8, 2021, 73 pages.
Office Action in U.S. Appl. No. 15/864,146, dated Jan. 13, 2021, 37 pages.
Office Action in U.S. Appl. No. 15/864,146, dated Jun. 3, 2021, 55 pages.
Office Action in U.S. Appl. No. 16/004,635, dated Aug. 3, 2022, 24 pages.
Office Action in U.S. Appl. No. 16/004,635, dated Jan. 23, 2023, 24 pages.
Office Action in U.S. Appl. No. 16/004,635, dated Jun. 3, 2021, 44 pages.
Office Action in U.S. Appl. No. 16/004,635, dated Nov. 24, 2021, 34 pages.
Office Action in U.S. Appl. No. 16/004,671, dated May 26, 2022, 43 pages.
Office Action in U.S. Appl. No. 16/004,671, dated Nov. 17, 2021, 40 pages.
Office Action in U.S. Appl. No. 16/004,671, dated Oct. 27, 2022, 40 pages.
Office Action in U.S. Appl. No. 16/004,757, dated Dec. 20, 2021, 31 pages.
Office Action in U.S. Appl. No. 16/004,757, dated Jul. 14, 2022, 30 pages.
Office Action in U.S. Appl. No. 16/004,757, dated Jun. 8, 2021, 26 pages.
Office Action in U.S. Appl. No. 16/004,757, dated Mar. 29, 2023, 36 pages.
Office Action in U.S. Appl. No. 16/004,796, dated Apr. 8, 2021, 35 pages.
Office Action in U.S. Appl. No. 16/004,796, dated Aug. 4, 2022, 45 pages.
Office Action in U.S. Appl. No. 16/004,796, dated Feb. 23, 2023, 31 pages.
Office Action in U.S. Appl. No. 16/004,796, dated Sep. 16, 2021, 46 pages.
Office Action in U.S. Appl. No. 16/004,837, dated Jun. 6, 2022, 8 pages.
Office Action in U.S. Appl. No. 16/356,391, dated Mar. 8, 2022, 10 pages.
Office Action in U.S. Appl. No. 16/356,391, dated Nov. 9, 2021, 13 pages.
Office Action in U.S. Appl. No. 16/356,478, dated Mar. 3, 2022, 5 pages.
Office Action in U.S. Appl. No. 16/710,058, dated Sep. 9, 2022, 14 pages.
Office Action in U.S. Appl. No. 16/710,176, dated Jun. 9, 2022, 7 pages.
Office Action in U.S. Appl. No. 16/710,205, dated May 10, 2023, 37 pages.
Office Action in U.S. Appl. No. 16/710,266, dated Apr. 12, 2023, 41 pages.
Office Action in U.S. Appl. No. 16/710,266, dated Nov. 17, 2022, 32 pages.
Office Action in U.S. Appl. No. 16/710,205, dated Oct. 26, 2022, 51 pages.
Opris et al., "What is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Panda et al., "Learning to Recognize Actions from Limited Training Examples Using a Recurrent Spiking Neural Model", arXiv, Oct. 19, 2017, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, 2018, 14 pages.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Patel et al., "Generative Design of Electromagnetic Structures Through Bayesian Learning," IEEE Transactions on Magnetics, Oct. 20, 2017, 54:1-4.
Paugam-Moisy et al., "Delay learning and polychronization for reservoir computing," Neurocomputing, Feb. 1, 2008, 71:1143-1158.
Pedregosa et al., "Scikit-learn: machine learning in Python," J. Mach. Learn. Res., Oct. 2010, 12:2825-2830.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Peters et al., "The projection of the lateral geniculate nucleus to area 17 of the rat cerebral cortex. I General description.," J. Neurocytol., Feb. 1976, 5:63-84.
Peters et al., "The projection of the lateral geniculate nucleus to area 17 of the rat cerebral cortex. V. Degenerating axon terminals synapsing with Golgi impregnated neurons," *J Neurocytol.*, 1979, 8:331-357.
Petlevski, "Modeling the Model: the World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 11(101):20140.
Petri et al., "Simplicial Activity Driven Model," Phys. Rev. Lett., Nov. 29, 2018, 121:1-5.
Pirino et al., "A topological study of repetitive co-activation networks in in vitro cortical assemblies," Physical Biology, Jan. 5, 2015, 12(1):016007.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Ramaswamy et al., "The neocortical microcircuit collaboration portal: a resource for rat somatosensory cortex," Front. Neural Circuits, Oct. 8, 2015, 9:1-14.
Rawal et al., "From nodes to networks: Evolving recurrent neural networks," arXiv preprint arXiv:1803.04439, Mar. 12, 2018, 8 pages.
Reimann et al., "Cliques of Neurons Bound into Cavities Provide a Missing Link between Structure and Function," Frontiers in Computational Neuroscience, Jun. 12, 2017, 11:1-16.
Reimann et al. "An algorithm to predict the connectome of neural microcircuits," Front. Comput. Neurosci., Oct. 8, 2015, 9:1-18.
Renart et al., "The asynchronous state in cortical circuits," Science 327, Jan. 29, 2010, 587-590.
Rosenbaum et al., "The spatial structure of correlated neuronal variability," Nat. Neurosci., Oct. 21, 2016, 20:107-114.
Salnikov, et al., "Simplicial complexes and complex systems," European Journal of Physics, Nov. 14, 2018, 40(1):014001.
Santos et al., "Topological phase transitions in functional brain networks," Physical Review E, Sep. 30, 2019, 100: 1-17.

(56) References Cited

OTHER PUBLICATIONS

Saucan et al., "Forman's Ricci Curvature—From Networks to Hypernetworks, "vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online], " SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al., "Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Singh et al., "Topological analysis of population activity in visual cortex," Journal of Vision, Jun. 2008, 8(8):11, 18 pages.
Sizemore et al., "The importance of the whole: Topological data analysis for the network neuroscientist," Network Neuroscience, Oct. 17, 2018, 3:1-18.
Sizemore et al., "Cliques and cavities in the human connectome," Journal of computational neuroscience, Feb. 2018, 44(1):115-45.
Skardal et al., "Abrupt Desynchronization and Extensive Multistability in Globally Coupled Oscillator Simplexes," Physical Review Letters 122, Jun. 19, 2019, pp. 1-6.
Song et al. "Highly nonrandom features of synaptic connectivity in local cortical circuits, " PLoS Biol., Mar. 1, 2005, 3:0507-0519.
Srivastava et al., "Dropout: a simple way to prevent neural networks from overfitting," The journal of machine learning research, Jan. 2014, 15(1):1929-58.
Stepanyants et al., "Neurogeometry and potential synaptic connectivity," Trends in Neurosci., Jun. 2, 2005, 28:387-394.
Stolz, "Computational Topology in Neuroscience," Dissertation for the Degree of Master of Science in Mathematical Modelling & Scientific Computing at the University of Oxford, Sep. 2014, 77 pages.
Suarez, "The interaction between task goals and the representation of choice options in decision-making," Thesis for the degree of Doctor of Philosophy, University College of London, Sep. 2017, pp. 1-176.
Sun et al., "Runtime detection of activated polychromous neuronal group towards its spatiotemporal analysis," 2015 International Joint Conference on Neural Networks, Jul. 12-17, 2015, 1-8.
Timsit et al., "Nervous-Like Circuits in the Ribosome Facts, Hypotheses and Perspectives," Int. J. Mol. Sci, Jun. 14, 2019, 20:1-22.
Tozzi et al., "Brain Projective Reality: Novel Clothes for the Emperor, Reply to comments of Topodynamics of metastable brains," Physics of Life Reviews, Jun. 28, 2017, pp. 1-11.
Tran et al., "Scale-variant topological information for characterizing the structure of complex networks," Physical Review E. Sep. 18, 2019, 100:1-18.
Turner, "Rips filtrations for quasimetric spaces and asymmetric functions with stability results," Algebraic & Geometric Topology, May 21, 2019, 19:1135-1170.
Tyukin et al., "High-Dimensional Brain: A Tool for Encoding and Rapid Learning of Memories by Single Neurons, " Bull Math Biol., Mar. 19, 2018, 11:4856-4888.
Varshney et al., "Structural properties of the caenorhabditis elegans neuronal network," PLoS Comput. Biol., Feb. 3, 2011, 7:1-22.
Velazquez et al., "On a Simple General Principle of Brain Organization," Frontiers in Neuroscience, Oct. 15, 2019, 13:1-16.
Wang et al., "Topological recurrent neural network for diffusion prediction," In2017 IEEE International Conference on Data Mining (ICDM), Nov. 18, 2017, pp. 475-484.
Wijaya et al., "Finding an appropriate equation to measure similarity between binary vectors: case studies on Indonesian and Japanese herbal medicines," BMC bioinformatics, Dec. 2016, 17:1-19.

wikipedia.org [online], "DBSCAN," retrieved on Oct. 5, 2022, retrieved from URL <https://en.wikipedia.org/wiki/DBSCAN>, 8 pages.
wikipedia.org [online], "Harris corner detector," retrieved on Oct. 5, 2022, retrieved on Oct. 5, 2022, retrieved from URL <https://en.wikipedia.org/wiki/Harris_corner_detector>, 6 pages.
wikipedia.org [online], "OPTICS algorithm," retrieved Oct. 5, 2022, retrieved from URL <https://en.wikipedia.org/wiki/OPTICS_algorithm>, 6 pages.
wikipedia.org [online], "Scale-invariant feature transform," retrieved on Oct. 5, 2022, retrieved from URL <https://en.wikipedia.org/wiki/Scale-invariant feature transform>, 19 pages.
Willshaw et al., "Nonholographic associative memory," Nature 222, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Yang et al., "Convolutional Neural Networks with Alternately Updated Clique," 2018 IEEE/CVF Conference on Computer Vision and Pattern Recognition, 2018, pp. 2413-2422.
Yang et al., "Road detection and centerline extraction via deep recurrent convolutional neural network U-Net," IEEE Transactions on Geoscience and Remote Sensing, May 14, 2019, 57(9):7209-20.
Young, "Standard Laterality Models: Neo-Eriksonian Perspectives," Chapter 8, Causality and Development, Jan. 2019, pp. 147-179.
U.S. Appl. No. 18/295,959, filed Apr. 5, 2023, Henry.
U.S. Appl. No. 16/710,266, filed Dec. 11, 2019, Marksram.
Office Action in European Appln. No. 19728992.9, mailed on Jan. 24, 2023, 8 pages.
Office Action in European Appln. No. 19728993.7, mailed Jan. 24, 2023, 8 pages.
Office Action in European Appln. No. 20829805.9, mailed Sep. 14, 2023, 10 pages.
Office Action in U.S. Appl. No. 16/004,671, dated Jun. 28, 2023, 39 pages.
Office Action in U.S. Appl. No. 16/004,796, dated Dec. 15, 2023, 33 pages.
Office Action in U.S. Appl. No. 16/004,796, dated Jun. 29, 2023, 31 pages.
Office Action in U.S. Appl. No. 18/161,414, dated Dec. 21, 2023, 33 pages.
U.S. Appl. No. 18/167,958, filed Feb. 13, 2023, Markram.
Office Action in Chinese Appln. No. 201980053140.6, mailed on Apr. 29, 2024, 12 pages (with English translation).
Office Action in Chinese Appln. No. 201980053463.5, mailed on May 23, 2024, 7 pages (with English translation).
Office Action in Chinese Appln. No. 201980053465.4, mailed on May 23, 2024, 7 pages (with English translation).
Office Action in Chinese Appln. No. 201980054063.6, mailed on May 23, 2024, 7 pages (with English translation).
U.S. Appl. No. 18/490,927, filed Oct. 20, 2023, Markram et al.
U.S. Appl. No. 18/487,566, filed Oct. 16, 2023, Markram et al.
International Preliminary Report on Patentability in International Appln. No. PCT/EP2022/073852, mailed on Mar. 28, 2024, 12 pages.
Mur-Artal et al., "ORB-SLAM: a versatile and accurate monocular SLAM system," IEEE transactions on robotics, Aug. 24, 2015, 31(5):1147-63.
Mur-Artal et al., "ORB-SLAM2: An open-source slam system for monocular, stereo, and rgb-d cameras," IEEE transactions on robotics, Jun. 12, 2017, 33(5):1255-62.
Office Action in Chinese Appln. No. 201980053141.0, mailed on Apr. 30, 2024, 19 pages (with English translation).
Office Action in Chinese Appln. No. 202080035412.2, mailed on Jan. 30, 2024, 22 pages (with English translation).
Office Action in U.S. Appl. No. 16/004,796, mailed on May 10, 2024, 40 pages.
Office Action in U.S. Appl. No. 16/710,266, mailed on Jan. 29, 2024, 35 pages.
U.S. Appl. No. 18/480,927, filed Oct. 20, 2023, Markram et al.
U.S. Appl. No. 16/004,635, filed Jun. 11, 2018, Markram.

(56) References Cited

OTHER PUBLICATIONS

U.S. Appl. No. 16/004,837, filed Jun. 11, 2018, Markram.
U.S. Appl. No. 16/004,796, filed Jun. 11, 2018, Markram.
U.S. Appl. No. 16/004,757, filed Jun. 11, 2018, Markram.
U.S. Appl. No. 18/527,555, filed Dec. 4, 2023, Markram.
U.S. Appl. No. 16/004,671, filed Jun. 11, 2018, Markram.
U.S. Appl. No. 18/611,781, filed Mar. 21, 2024, Markram.
U.S. Appl. No. 16/356,391, filed Mar. 18, 2019, Markram.
U.S. Appl. No. 18/295,959, filed Apr. 5, 2023, Markram.
U.S. Appl. No. 16/356,478, filed Mar. 18, 2019, Hess.
U.S. Appl. No. 18/161,414, filed Jan. 30, 2023, Hess.
U.S. Appl. No. 16/710,266, filed Dec. 11, 2019, Markram.
U.S. Appl. No. 16/710,058, filed Dec. 11, 2019, Markram.
U.S. Appl. No. 18/490,927, filed Oct. 20, 2023, Markram.
U.S. Appl. No. 16/710,205, filed Dec. 11, 2019, Markram.
U.S. Appl. No. 18/487,566, filed Oct. 16, 2023, Markram.
U.S. Appl. No. 16/710,176, filed Dec. 11, 2019, Markram.
U.S. Appl. No. 16/710,080, filed Dec. 11, 2019, Markram.
U.S. Appl. No. 18/295,969, filed Apr. 5, 2023, Henry.
U.S. Appl. No. 18/656,669, filed May 7, 2024, Markram.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 17/454,347, filed Nov. 10, 2021, Lütgehetmann.
U.S. Appl. No. 15/864,146, filed Jan. 8, 2018, Reimann.
U.S. Appl. No. 18/188,888, filed Mar. 23, 2023, Reimann.

* cited by examiner

DISTANCE METRICS AND CLUSTERING IN RECURRENT NEURAL NETWORKS

CROSS-REFERENCE TO RELATED APPLICATIONS

This application is a continuation of U.S. application Ser. No. 18/167,958, filed Feb. 13 2023, which is a continuation of U.S. application Ser. No. 16/710,176, filed 11 Dec. 2019, now U.S. U.S. Pat. No. 11,580,401, all of which are hereby incorporated by reference.

TECHNICAL FIELD

This invention relates to distance metrics and clustering in recurrent neural networks, and more particularly to defining distance metrics relevant to the processing results of recurrent neural networks and using those distance metrics for clustering.

BACKGROUND

Artificial neural networks are devices that are inspired by the structure and functional aspects of networks of biological neurons. In particular, artificial neural networks mimic the information encoding and other processing capabilities of networks of biological neurons using a system of interconnected constructs called nodes. The arrangement and strength of connections between nodes in an artificial neural network determines the results of information processing or information storage by the artificial neural network.

Neural networks can be trained to produce a desired signal flow within the network and achieve desired information processing or information storage results. In general, training a neural network will change the arrangement and/or strength of connections between nodes during a learning phase. The training will be directed to achieving certain processing results. The processing results should be consistent with a set of examples, i.e., a training set. A neural network can be considered trained when sufficiently appropriate processing results are achieved by the neural network for given sets of inputs.

Among the ends to which neural networks can be trained is clustering. Clustering groups of objects such that the objects in a group or cluster are more similar to each other on some metric than to objects in other groups or clusters. Clustering is a part of many data processing pipelines-including, e.g., bioinformatics, data mining, data compression, statistical data analysis, and machine learning. Due to the importance of clustering, a variety of clustering algorithms have been developed and neural networks have been trained to cluster inputs. These algorithms and neural networks are more or less useful in a variety of different contexts. It should however be noted that there is no objectively "correct" clustering result. Rather, the desired clustering results depend on the results that one wants to achieve.

A classic example of a neural network that has been trained to perform clustering is a self-organizing map. Self-organizing maps are trained using competitive learning to produce a low-dimensional discretized representation of the input training samples. This representation is also called a "map." Because training is fundamental to the processing performed by neural networks, these neural networks are generally unable to process data that deviates in form or in type from the data in the training set.

SUMMARY

The present methods and apparatus use topological patterns of activity that arise in even an untrained recurrent artificial neural network to define distance metrics. The distance metrics can be useful, e.g., when clustering different inputs. The topological patterns of activity generally occur over a period of time and can be represented in a collection of digits. At least some of the topological patterns of activity arise innately due to the structure of the recurrent artificial neural network. Hence, even an untrained recurrent artificial neural network can be used to cluster different inputs.

As an aside, even though some of the topological patterns of activity arise without training of the recurrent artificial neural network, it is not necessary that the recurrent artificial neural network remain completely untrained. Rather, the recurrent artificial neural network can itself be trained to synthetize the patterns that arise without training. It is not necessary that the patterns that arise without training be output from the recurrent artificial neural network and input into a separate classifier. Rather, the same recurrent artificial neural network in which the topological patterns of activity arise even without training can be trained to perform clustering activities.

In one aspect, methods, systems and apparatus, including computer programs encoded on a computer storage medium, for clustering inputs are described. For example, a method includes determining whether topological patterns of activity in a collection of topological patterns occur in a recurrent artificial neural network in response to input of first data into the recurrent artificial neural network, and determining a distance between the first data and either second data or a reference based on the topological patterns of activity that are determined to occur in response to the input of the first data. Corresponding systems and apparatus, including computer programs encoded on a computer storage medium, are also possible.

In another aspect, a method includes receiving information identifying occurrences of topological patterns of activity in a recurrent artificial neural network in response to input of a plurality of different elements into the recurrent artificial neural network, calculating distances between the different elements based on the occurrences of the topological patterns of activity, and adjusting one or more characteristics of the recurrent artificial neural network to increase or decrease the distances. Corresponding systems and apparatus, including computer programs encoded on a computer storage medium, are also possible.

These and other aspects can include one or more of the following features. Whether the topological patterns of activity in the collection occur in the recurrent artificial neural network in response to input of second data into the recurrent artificial neural network can also be determined. The distance is determined between the first data and the second data by comparing the topological patterns of activity that are determined to occur in response to the input of the first data with the topological patterns of activity that are determined to occur in response to the input of the second data. The distance can be determined between the first data and either a centroid of a cluster or a cluster boundary.

The occurrence of the topological patterns of activity can be represented in a collection of binary or multivalued digits that each indicate whether a respective topological pattern occurred or not. The distance can be determined using a distance metric that treats a first subset of the topological patterns of activity in the collection differently from a second subset of topological patterns of activity in the collection. For example, the first subset of the topological patterns can be weighed as more strongly indicative of distance than the second subset of topological patterns. The first data and the second data can include multiple classes of input data. The first subset of the topological patterns need only include topological patterns that arise in a region of the recurrent artificial neural network that is primarily perturbed by a single class of the input data. Each of the classes of input data can originate from a different sensor. The single class of input data need only originate only from a first of the sensors. The recurrent artificial neural network can be trained and the second subset of the topological patterns need only include topological patterns that arise in a region of the recurrent artificial neural network that reflects the training. The recurrent artificial neural network can also be untrained. A complexity of the topological patterns in the second subset of the topological patterns can be higher than a complexity of the topological patterns in the first subset. At least some of the topological patterns in the first subset can be included in the topological patterns in the second subset. Whether the topological patterns of activity in the collection occur in the recurrent artificial neural network in response to input of data into the recurrent artificial neural network can be repeatedly determined and the input data—including the first data and the second data—can be clustered based on a distance between the data. The distance is determined by comparing the respective topological patterns of activity that are determined to occur in response to the input of the data. The topological patterns of activity can include simplex patterns of activity occur. For example, the simplex patterns can enclose cavities. A timing of activity having a complexity that is distinguishable from other activity that is responsive to the input can be determined and topological structures can be identified based on the timing of the activity that has the distinguishable complexity.

A distance between elements can be determined by comparing the topological patterns of activity that are determined to occur in response to the input of the first element with the topological patterns of activity that are determined to occur in response to the input of the second element. The distances can be calculated using a distance metric that treats a first subset of the topological patterns of activity in the collection differently from a second subset of topological patterns of activity in the collection. The distance calculation can weigh the first subset of the topological patterns as more strongly indicative of distance than the second subset of topological patterns. A complexity of the topological patterns in the second subset of the topological patterns can be lower than a complexity of the topological patterns in the first subset. The information identifying occurrences of topological patterns of activity can include a first binary vector for a first element and a second binary vector for a second element. The distances can be calculated by calculating the distances between the binary vectors. The recurrent artificial neural network can be untrained.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
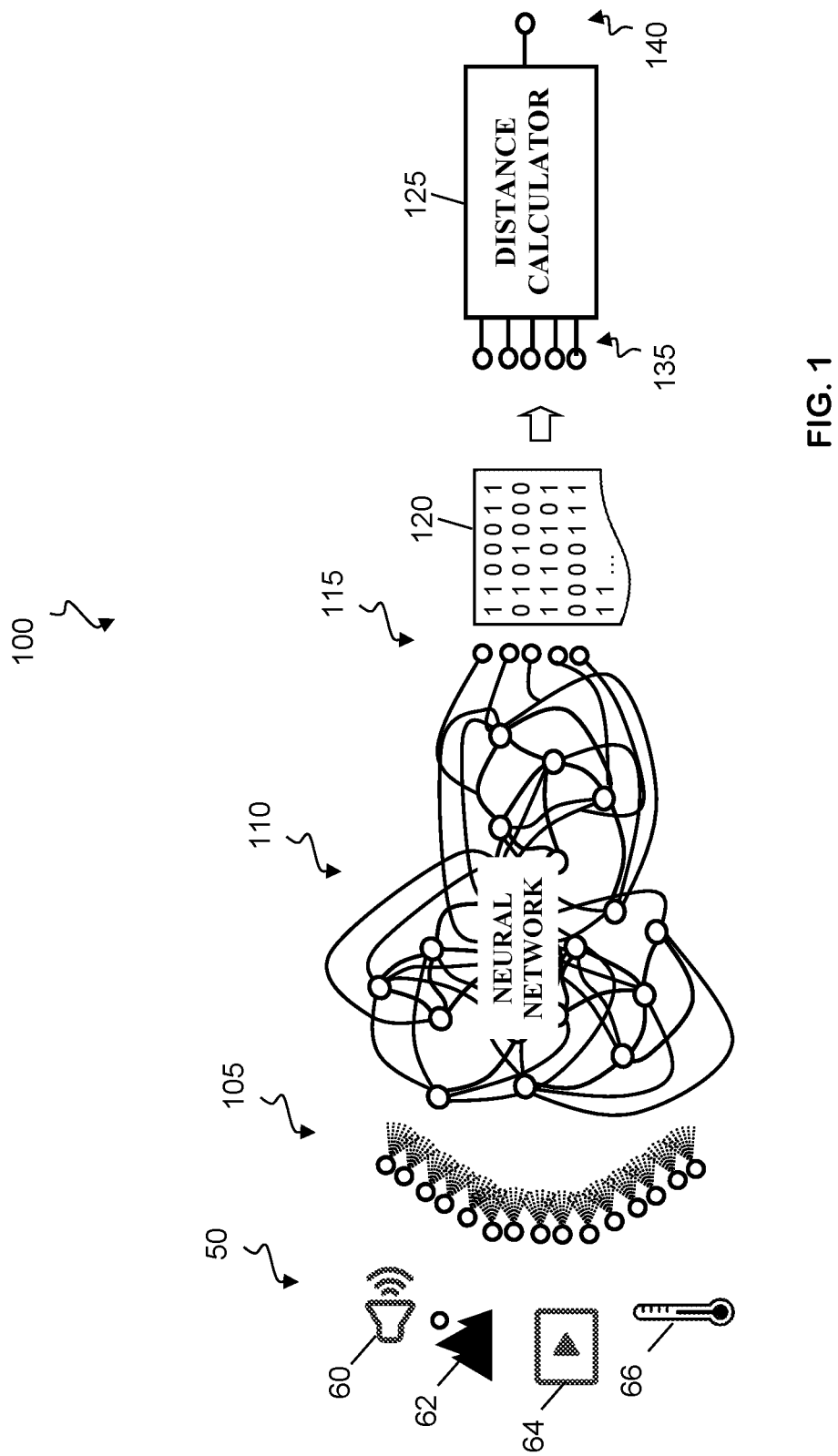
FIG. 1 is a schematic representation of an implementation of an artificial neural network system that abstracts and clusters data that originates from multiple, different sensors.

Biological brains cope with different types of input including, e.g., vision, audio, proprioception. Despite the diversity of the input, biological brains can extract different properties from that input and respond, e.g., with appropriate movements or conceptual abstractions responsive to the input. Neuroscientists have found a rich diversity of subsystems in brains that participate in these processes. They include, e.g., specific cells in the visual system that encode edges having particular orientations, "place cells" in the hippocampus that become active when an animal is at a precise spatial location, and even cells that encode even abstract but selective concepts (so called "grandmother cells"). The subsystems can furthermore encode time, spatial, conceptual, and/or hierarchical relationships. In short, part of a biological brain's innate functioning can be considered a combination of specific and unspecific clustering-some of which is innate and some of which is learned.

In some cases, recurrent artificial neural networks can be constructed to embody at least some of the properties of biological brains. Such recurrent artificial neural networks can incorporate innate specific structures of real brains and encode non-linear projections that are useful for different types of computations and clustering. The specific structures can include, e.g., structures that perform pre-clustering and approximately cluster inputs and reduce the dimensionality of the input data. The specific structures can also include, e.g., structures that perform direct and specific clustering of specific concepts—without learning those concepts in advance. As mentioned previously, a recurrent artificial neural network can itself be trained to synthetize the patterns in these structures and that arise without training for subsequent learned clustering.

Thus, unlike mathematical clustering algorithms that require the definition of an explicit distance function, an up-front definition of a distance function is not necessary for such recurrent artificial neural networks. Instead, the distance function(s) are implicitly encoded by the wiring of the nodes and their functional properties. Indeed, different nodes and different structures of the recurrent artificial neural networks can encode different distance functions. As a result, some structures or states of the recurrent artificial neural network may cluster input in an approach that resembles hierarchical clustering, whereas other structures or states may—at the same time—cluster input in an approach that resembles density-based clustering.

Topological patterns of activity that arise in even an untrained recurrent artificial neural networks thus represent a clustering of the different inputs. The topological patterns represent the state of a recurrent artificial neural network that arises in response to an input perturbation. The topological patterns filter out unnecessary or redundant characteristics of the response and make abstractions that are useful for clustering accessible. As discussed further below, in some cases, decision moments can be identified to further ensure that unnecessary or redundant characteristics of the response are filtered out and not used for clustering.

The topological patterns can be read from a recurrent artificial neural network as, e.g., a collection of (generally binary) digits that each represent the presence or absence of a respective topological pattern of activity in the network. Each of the digits represents a specific abstraction performed by the network on the input data. As discussed further below, each abstraction can be arbitrarily complex. A single digit can thus encode an arbitrarily complex abstraction and a set of digits can convey a set of abstractions, each with an arbitrary level of complexity.

The collection of digits furthermore allows distance metrics to be defined. In other words, the distance between two different collections of digits that arise in response to different inputs can be used to define the distance between those inputs. For example, a distance metric can be as simple as counting the number of certain types of simplices and calculating, e.g., a Hamming distance. As another example, a distance metric can be relatively more complicated, such as the earth mover distance calculated across the different simplex orders and their topographic appearance.

FIG. 1 is a schematic representation of an implementation of an artificial neural network system 100 that abstracts and clusters input data 50. Neural network system 100 includes a collection of inputs 105, the recurrent neural network 110 itself, a collection of outputs 115, and a distance calculator 125 that is dedicated to calculating the distance or the (dis)similarity between the abstractions of data 50 that are output over outputs 115.

In the illustrated implementation, recurrent neural network 110 receives data 50 that originates from multiple, different sensors over inputs 105. The sensors can be, e.g., transducers that convert different physical properties into data or devices that sense only data, such as, e.g., a device that senses the content of a document or data stream. In other implementations, recurrent neural network 110 receives data 50 that originates from a single sensor. In any case, the abstraction of data 50 by neural network 110 can be read from outputs 115 as, e.g., a collection of (generally binary) digits 120 that each represent the presence or absence of a respective topological pattern of activity in neural network 110 responsive to input data 50. These responsive patterns of activity represent a specific abstraction performed by the neural network 110 on input data 50. As discussed further below, the abstraction can be arbitrarily complex. A single digit can thus encode an arbitrarily complex abstraction and a set of digits can convey a set of abstractions, each with an arbitrary level of complexity.

Further, the topological patterns of activity—and their representation in digits 120—can be "universal" in the sense that they are not dependent on the origin of the data being input into the neural network. Rather, the topological patterns of activity express abstract characteristics of the data 50 that is being input into neural network 110—regardless of the origins of that data.

In more detail, data 50 may originate from different sensors and have different formats. For example, certain classes of data 50 (e.g., video or audio data) may change relatively rapidly in time, whereas other classes of data 50 (e.g., still image or temperature) may change relatively slowly or not at all. Notwithstanding the different origins and formats, neural network 110 can still abstract characteristics from the data.

For example, neural network 110 may abstract:
physical traits (e.g., color, shape, orientation, speed),
categories (e.g., car, cat, dog), and/or
abstract qualitative traits (e.g., "alive" vs. "dead," "smooth" vs. "rough," "animate" vs. "inanimate," "hot" vs. "cold," "open" vs. "closed").

The topological patterns of activity—and their representation in digits 120—are the response of neural network 110 to the diverse data 50. Typically, multiple topological patterns of activity will arise in response to a single input, whether the input is discrete (e.g., a still photo or a single reading from a transducer that measures a physical parameter) or continuous (e.g., a video or an audio stream).

At times, neural network 110 will respond to the input of data 50 that originates from different sensors with one or more topological patterns that are the same, even if other topological patterns are different. For example, neural network 110 may respond to either a temperature reading or a still image of a desert with a topological pattern that represents a qualitative assessment of "hot," even if other topological patterns are also part of the response to each input. Similarly, neural network 110 can respond to the conclusion of a musical composition or a still image of a plate with crumbs with a topological pattern that represents a qualitative assessment of "done," even if other topological patterns are also part of the response to each input. Thus, at times, the same characteristic may be abstracted from data that has different origins and different formats.

At times, neural network 110 will respond to the input of data 50 that originates from different sensors with one or more topological patterns that represent the synthesis or fusion of the characteristics of the data from those sensors. In other words, a single such pattern can represent an abstraction of the same characteristic that is present in different types of data. In general, the fusion or synthesis of data from different sensors will act to cause such patterns to arise or the strength of the activity of such patterns to increase. In other words, data from different sensors can act as "corroborative evidence" that the same characteristic is present in the diverse input data.

In some cases, topological patterns that represent the synthesis or fusion of the characteristics of data from different sensors will only arise if certain characteristics are present in the data from different sensors. Neural network 110 can in effect act as an AND gate and require that certain characteristics in data from different sensors in order for certain patterns of activity to arise. However, this need not be the case. Instead, the magnitude of the activity that forms a pattern may increase or the timing of the activity may shorten in response to data from different sensors. In effect, the topological patterns of activity—and their representation in digits 120—represent abstractions of the characteristics of data 50 in a very rich state space. In other words, the topological patterns of activity and their representation are not necessarily the predefined "results" of processing input data in the sense that, e.g., a yes/no classification is the predefined result yielded by a classifier, a set of related inputs is the predefined result yielded by a clustering device, or a prediction is the predefined result yielded by a forecasting model. Rather, the topological patterns are abstractions of the characteristics the input data in a richer state space. Although that state space may at times include abstractions such as a yes/no classification, the state space is not limited to only those predefined results.

Further, the topological patterns may abstract characteristics of only a portion (e.g., a particular region of an image or a particular moment in a video or audio stream or a particular detail of the input such as a pixel) of the input data, rather than the entirety of the input data. Thus, the state space of the abstractions is neither limited to either a predefined type of result (e.g., a classification, a cluster, or a forecast), nor to abstractions of the entirety of the input data. Rather, the topological patterns are a tool that allows the processing by a high-dimensional, non-linear, recurrent dynamic system (i.e., neural network 110) to be read. The topological patterns extract correlates of the data from the different sensors that arise in neural network 110, including correlates that fuse the data into a more complete "whole."

Upon input of data 50, neural network 110 will respond with a certain activity. That activity will include:
  activity that does not comport with defined topological patterns, and
  activity that does comport with defined topological patterns.

The activity in neural network 110 that does not comport with defined topological patterns can in some cases be incorrect or incomplete abstractions of the characteristics of the input data 50. Further, the activity in neural network 110 that does comport with defined topological patterns can abstract different characteristics of the input data 50. Each of the abstracted characteristics may be more or less useful depending on the application. By limiting digits 120 to representation of certain topological patterns, both incorrect or incomplete abstractions and abstraction of characteristics that are not relevant to a particular application can be "filtered out" from digits 120.

In the illustrated implementation, data 50 includes one or more of sound data 60 that originates from, e.g., a microphone, still image data 62 that originates from, e.g., a still camera, video data 64 that originates from, e.g., a video camera, and temperature data 66 that originates from, e.g., a temperature sensor. This is for illustrative purposes only. Data 50 need not include one or more of sound data 60, still image data 62, video data 64, temperature data 66. Also, data 50 can include one or more of a variety of other different types of data including, e.g., pressure data, chemical composition data, acceleration data, electrical data, position data, or the like. As discussed further below, data 50 that originates from a sensor can undergo one or more processing actions prior to input into neural network 110. Examples of such processing actions include, e.g., non-linear processing in an artificial neural network device.

As discussed above, the topological patterns that arise in neural network 110 are abstractions of the characteristics the input data 50 in a rich state space. If one were to constrain data 50 to originating from a small number of sensors, it may be unlikely that neural network 110 would abstract the data from that sensor in certain ways. By way of example, it may be unlikely that neural network 110 would abstract temperature data 66 by itself into a pattern of activity that corresponds to a spatial trait like shape or orientation. However, as data from different sensors is input into neural network 110, the perturbations provoked by diverse input data 50 meet each other and can collectively influence the activity in neural network 110. As a result, the neural network 110 may abstract input data 50 into different or more certain patterns of activity.

For example, there may be a degree of uncertainty associated with the presence or absence of a pattern. If data 50 includes data from diverse range of sensors, both the diversity of the patterns and the certainty of the patterns may increase as the data 50 that originates from different sensors is synthesized or fused within the neural network 110. By way of analogy, a passenger who is sitting in a train at a train station may look out the window and see an adjacent train that appears to be moving. That same passenger may also, e.g., feel forward pressure from the seat. The fusion or synthesis of this information increases the passenger's degree of certainty that the passenger's train is moving, rather than the adjacent train. When neural network receives diverse input data 50, the perturbations provoked by that data can collectively be abstracted into different or more certain patterns of activity.

The ability of neural network 110 to process input data 50 from diverse sensors also provides a degree of robustness to the abstraction of that data. By way of example, one sensor of a group may become inaccurate or even inoperative and yet neural network 110 can continue to abstract data 50 from the other sensors. Often, neural network 110 will abstract data 50 from the other sensors into the same patterns of activity that would have arisen had all of the sensors been functioning as designed. However, in some instances, the certainty of those abstractions may decrease. Nevertheless, abstraction can continue even if such a problem should arise.

In the illustrated implementation, inputs 105 are schematically represented as a well-defined input layer of nodes that each passively relay the input to one or more locations in neural network 110. However, this is not necessarily the case. For example, in some implementations, one or more of inputs 105 can scale some portion or all of the input data or perform other preliminary processing before data is conveyed to neural network 110. As another example, data 50 may injected into different layers and/or edges or nodes throughout neural network 110, i.e., without a formal input layer as such. For example, a user can specify that data is to be injected into specific nodes or links that are distributed throughout network 110. As another example, neural network 110 need not be constrained to receiving input in a known, previously defined manner (e.g., always injecting a first bit into a first node, the second bit into a second node, . . . etc.). Instead, a user can specify that certain bits in the data are to be injected into edges rather than nodes, that the order of injection need not follow the order that the bits appear, or combinations of these and other parameters. Nevertheless, for the sake of convenience, the representation of inputs 105 as an input layer will be maintained herein.

Neural network 110 is schematically illustrated as a recurrent neural network. In recurrent neural networks, the connections between nodes form a directed graph along a temporal sequence and the network exhibits temporal dynamic behavior. In general, neural network 110 is a relatively complex neural network that is modelled on a biological system. In other words, neural network 110 can itself model a degree of the morphological, chemical, and other characteristics of a biological system. In general, neural networks 110 that are modelled on biological systems are implemented on one or more computing devices with a relatively high level of computational performance.

In contrast with, e.g., traditional feedforward neural networks, neural networks 110 that are modelled on biological systems may display background or other activity that is not responsive to input data 50. Indeed, activity may be present in such neural networks 110 even in the absence of input data 50.

However, upon input of data 50, a recurrent neural network 110 will be perturbed. Since the response of such a neural network 110 to a perturbation may depend, in part, on the state of neural network 110 at the time that data 50 is input, the response of such a neural network 110 to the input of data 50 may also depend on the background or other activity that is already present in neural network 110.

Nevertheless, even though such activity in a neural network is not responsive only to the input of data 50, it is responsive to input data 50. Digits 120 can thus represent the presence or absence topological structures that arise in the patterns of activity responsive to the input data even in a relatively complex neural network that is modelled on biological systems.

In the illustrated implementation, outputs 115 are schematically represented as a multi-node output layer. However, outputs 115 need not be a multi-node output layer. For example, output nodes 115 can be individual "reader nodes" that identify occurrences of a particular pattern of activity at a particular collection of nodes in neural network 110 and hence read the output of neural network 110. The reader nodes can fire if and only if the activity at a particular collection of nodes satisfies timing (and possibly magnitude or other) criteria. For example, output nodes 115 can be connected to a collection of nodes in neural network 110 and indicate the presence or absence topological structures based on, e.g., the activity levels of each individual node crossing a respective threshold activation level, a weighted sum of the activity levels of those nodes crossing a threshold activation level, or a non-linear combination of the activity levels of those nodes crossing a threshold activation level.

The output received over outputs 115 is collection of digits 120 that each represent the presence or absence of a respective pattern of activity in neural network 110, which can be implemented as a relatively complex neural network that models characteristics of a biological system. Collection 120 is only schematically illustrated and collection 120 can be, e.g., one-dimensional vector of digits, a two-dimensional matrix of digits, or other collection of digits. In general, the digits in collection 120 will be binary and indicate in a yes/no manner whether a pattern of activity is present or not. However, this is not necessarily the case. Instead, in some implementations, the digits in collection 120 will be multi-valued. The values can denote characteristics of the presence or absence of a respective pattern of activity in neural network 110. For example, the values can indicate the strength of the activity or a statistical probability that a specific pattern of activity is in fact present. By way of example, activity that is relatively large in magnitude or that occurs within a relatively short window of time can be considered as indicating that a specific operation has been performed or was likely to have been performed. In contrast, activity that is relatively small in magnitude or that occurs over a relatively longer time can be considered less likely to indicating that a specific operation has been performed.

The information in collection 120 is holographically represented in the sense that information about the value of a single digit is distributed across the values of other digits in the collection 120. In other words, random subsets of digits in collection 120 also contain information about the abstractions performed by the neural network 110 to input 50, just at lower resolution than would be present if all the digits in collection 120 were present. As discussed further below, different topological patterns have different degrees of complexity. Some relatively more complex patterns may include relatively less complex patterns and simple patterns can be assembled into more complex patterns. Moreover, relatively high levels of abstraction that are represented by some digits may be correlated to some extent with other abstractions represented by other digits. For example, a digit that represents the occurrence of an abstract qualitative trait like "alive" may be correlated with a digit that represents a qualitative trait like "animate." Information about the occurrence of some topological patterns thus inherently includes some information about the occurrence of other topological patterns.

For the sake of convenience, the remainder of the application will refer to the digits of collection 120 as binary bits and the FIGS. will illustrate them as such. However, it is to be understood that in all cases the digits of collection 120 can also be multi-valued to encode various aspects of the abstractions performed by the network.

Distance calculator 125 is a device that is dedicated to calculating the distance or the (dis)similarity between the different abstractions of data 50 that are output over outputs 115. Distance calculator 125 can use any of a variety of different approaches to calculate the distance. For example, distance calculator 125 can calculate a Hamming distance, an earth mover distance, a Jaccard similarity measure, or other distance measure. A survey of distance measures that are applicable to binary features vectors can be found in the publication entitled "A survey of Binary similarity and distance measures" by Sung-seok Choi et al. (Journal of Systemics, Cybernetics and Informatics, p. 43-48 (2010)). An example selection of an appropriate distance measure can be found in Wijaya et al. (BMC Bioinformatics 17:520 (2016)). The contents of both of these are incorporated herein by reference.

Distance calculator 125 includes an input 135 and an output 140. Input 135 is coupled to receive representations of the patterns of activity in neural network 110, namely, digit collection 120. Distance calculator 125 can receive digit collection 120 in a variety of ways. For example, the digits in collection 120 can be received as collection of discrete events or as a continuous stream over a real time or non-real time communication channel.

Output 140 is coupled to output a measure of distance that relates to the digit collection 120 received from neural network 110. For example, output 140 can output a measure distance between two digit collections 120 that have been output from neural network 110, between a digit collection 120 that has been output from neural network 110 and a digit collection that has been output by another neural network 110, and/or between digit collection 120 that has been output from neural network 110 and a reference such as, e.g., a centroid of a cluster or a cluster boundary.

In some implementations, distance calculator 125 is integrated into neural network 110. In other words, neural network 110 can output a distance measure directly. The distance measure can measure distance between, e.g., two different sets of input into neural network 110, the evolution of a single set of input into neural network 110, or the distance between the input data and a reference. In some implementations, the distance measure output from neural network 110 can be passed on to another application and/or used for training neural network 110. The distance measures output from distance calculator 125 can be used in a variety of different contexts. For example, distance measures can be used to evaluate resultant clusters, determine an optimal number of clusters, identify correlations among attributes in clusters, and estimate the degree of clustering in a data set. For example, Davies-Bouldin indices, Dunn indices, silhouette coefficients, and Hopkins statistics can be calculated using distance metrics.

The distance measures output from distance calculator 125 can be beneficial in these and other contexts. For high-dimensional data, distance becomes less useful for resolving elements and clusters. In particular, all of the elements in the space appear comparably (dis)similar as the number of dimensions increases. In other words, as the number of dimensions approaches infinity, the difference between the distance between nearest neighbors and the distance between farthest neighbors approaches zero.

However, digits 120 that represent the presence or absence of a respective topological pattern of activity responsive to input data 50 can be valuable for calculating distance metrics for high-dimensional data. As a threshold matter, even the simplest of abstractions that are represented in digits 120 inherently reduces the dimensionality of the input data. Digits 120 thus inherently define the distance between even high dimensional input data based on the topological patterns of activity that arise in recurrent neural network 110 in response to the input data 50.

Further, as discussed above, a topological pattern of activity can embody different levels of abstraction. For example, an abstraction represented by the occurrence of a first topological pattern may require the co-occurrence of two other topological patterns that represent other, "lower level" abstractions. A set of digits can thus convey a set of abstract characteristics that are useful for computing a distance metric according to a diverse levels of abstraction.

The different levels of abstraction also allow entirely new distance metrics to be defined. For example, a single digit 120 that indicates that different elements were abstracted to the same relatively high level abstraction can be a stronger indicator of similarity than a host of digits 120 that represent abstraction of input data to a variety of relatively low level abstractions. This contrasts with, e.g., a Hamming distance and other approaches that inherently treat all of the information in a feature vector similarly.

In some implementations, recurrent neural network 110 can be trained to achieve certain processing results. In general, the training will teach the recurrent neural network 110 to arrive at higher level abstractions based on combinations of lower level abstractions. Measurements of the distance between two elements that thus be tailored by training and training-specific distance metrics can be defined. A user need not have prior knowledge or an understanding of the dimensions of input data that are relevant to the processing results or to the resultant distance metric. Rather, the training process itself can tailor recurrent neural network 110 to achieve desired processing results and provide abstractions that are relevant for computing distance.

Figure 2:
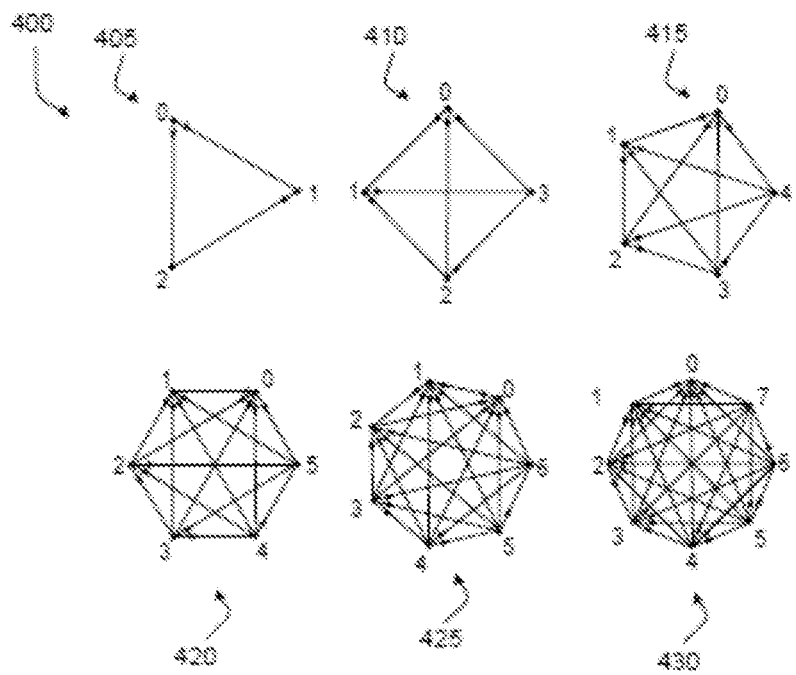
FIGS. 2 and 3 are representations of patterns of activity that can be identified and "read" to generate a collection of digits from neural network.

FIG. 2 is a representation of patterns 400 of activity that can be identified and "read" to generate collection 120 from neural network 110 (FIG. 1).

Patterns 400 are representations of activity within a recurrent artificial neural network. To read patterns 400, a functional graph is treated as a topological space with nodes as points. Activity in nodes and links that comports with patterns 400 can be recognized as ordered regardless of the identity of the particular nodes and/or links that participate in the activity. In the illustrated implementation, patterns 400 are all directed cliques or directed simplices. In such patterns, activity originates from a source node that transmits signals to every other node in the pattern. In patterns 400, such source nodes are designated as point 0 whereas the other nodes are designated as points 1, 2 . . . . Further, in directed cliques or simplices, one of the nodes acts a sink and receives signals transmitted from every other node in the pattern. In patterns 400, such sink nodes are designated as the highest numbered point in the pattern. For example, in pattern 405, the sink node is designated as point 2. In pattern 410, the sink node is designated as point 3. In pattern 415, the sink node is designated as point 3, and so on. The activity represented by patterns 400 is thus ordered in a distinguishable manner.

Each of patterns 400 has a different number of points and reflects ordered activity in a different number of nodes. For example, pattern 405 is a 2D-simplex and reflects activity in three nodes, pattern 410 is a 3D-simplex and reflects activity in four nodes, and so on. As the number of points in a pattern increases, so does the degree of ordering and the complexity of the activity. For example, for a large collection of nodes that have a certain level of random activity within a window, some of that activity may comport with pattern 405 out of happenstance. However, it is progressively more unlikely that random activity will comport with the respective of patterns 410, 415, 420 . . . . The presence of activity that comports with pattern 430 is thus indicative of a relatively higher degree of ordering and complexity in the activity that the presence of activity that comports with pattern 405.

Different duration windows can be defined for different determinations of the complexity of activity. For example, when activity that comports with pattern 430 is to be identified, longer duration windows can be used than when activity that comports with pattern 405 is to be identified.

Figure 3:
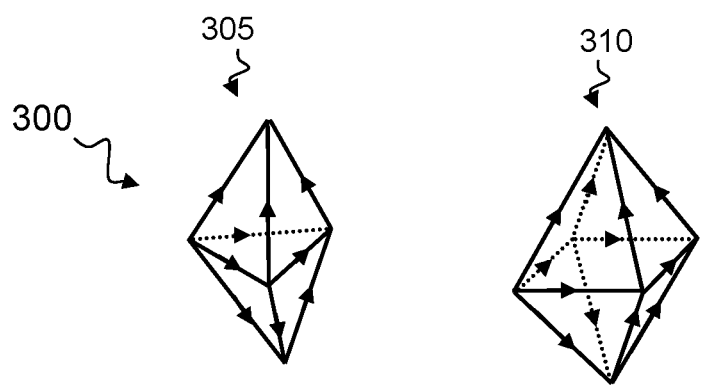

FIG. 3 is a representation of patterns 300 of activity that can be identified and "read" to generate binary digit collection 120 from neural network 110 (FIG. 1).

Patterns 300 are groups of directed cliques or directed simplices of the same dimension (i.e., have the same number of points) that define patterns involving more points than the individual cliques or simplices and enclose cavities within the group of directed simplices.

By way of example, pattern 305 includes six different three point, 2-dimensions patterns 405 that together define a homology class of degree two, whereas pattern 310 includes eight different three point, 2-dimensions patterns 405 that together define a second homology class of degree two. Each of the three point, 2-dimensions patterns 405 in patterns 305, 310 can be thought of as enclosing a respective cavity. The nth Betti number associated with a directed graph provides a count of such homology classes within a topological representation.

The activity represented by patterns such as patterns 300 represents a relatively high degree of ordering of the activity within a network that is unlikely to arise by random happenstance. Patterns 300 can be used to characterize the complexity of that activity.

In some implementations, only some patterns of activity are identified and/or some portion of the patterns of activity that are identified are discarded or otherwise ignored. For example, with reference to FIG. 2, activity that comports with the five point, 4-dimensional simplex pattern 415 inherently includes activity that comports with the four point, 3-dimensional and three point, 2-dimension simplex patterns 410, 405. For example, points 0, 2, 3, 4 and points 1, 2, 3, 4 in 4-dimensional simplex pattern 415 of FIG. 2 both comport with 3-dimensional simplex pattern 410. In some implementations, patterns that include fewer points—and hence are of a lower dimension—can be discarded or otherwise ignored. As another example, only some patterns of activity need be identified. For example, in some implementations only patterns with odd number of points (3, 5, 7, . . . ) or even numbers of dimensions (2, 4, 6, . . . ) are identified. Notwithstanding the identification of only some patterns, information about the activity in the neural network can nevertheless be holographically represented, i.e., at lower resolution that if all patterns of identified and/or represented in an output.

As discussed above, the patterns of activity that are responsive to input data 50 represent a specific operation of arbitrary complexity performed by the neural network 110 on that input data 50. In some implementations, the complexity of the operation will be reflected in the complexity of the topological pattern. For example, the operation or abstraction represented by the five point, 4-dimensional simplex pattern 415 may be more complex than the operations or abstractions represented by the four point, 3-dimensional and three point, 2-dimension simplex patterns 410, 405. In such cases, digits that represent the presence of activity convey that a set operations or abstractions is performed in neural network 110, where each of these operations or abstractions has an arbitrary level of complexity.

Figure 4:
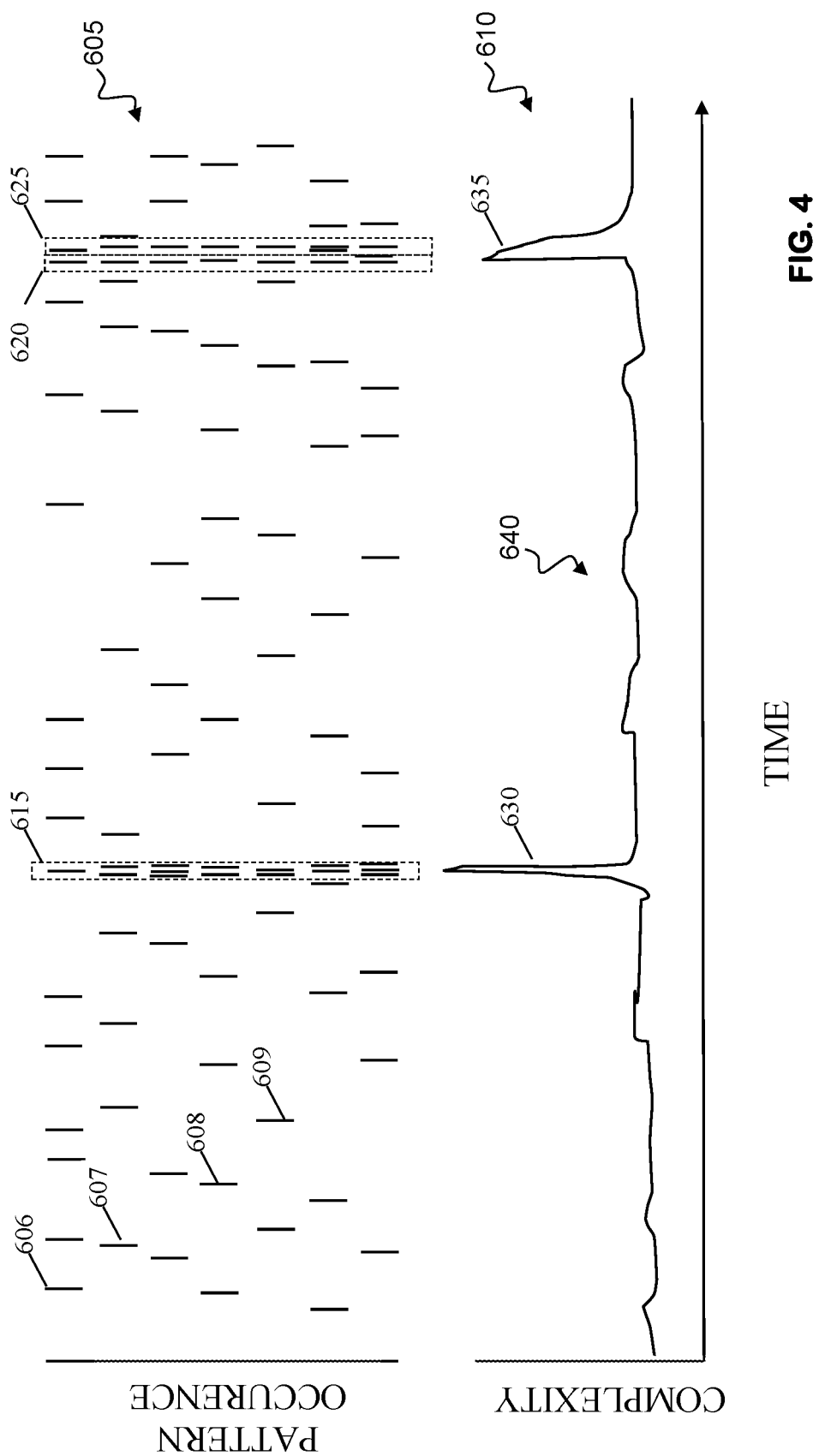
FIG. 4 is a graph that represents occurrences of patterns as a function of time.

FIG. 4 is a schematic representation of a determination of the timing of activity patterns that have a distinguishable complexity. The determination represented in FIG. 4 can be performed as part of an identification or "reading" of patterns of activity to generate binary digit collection 120 from neural network 110 (FIG. 1).

FIG. 4 includes a graph 605 and a graph 610. Graph 605 represents occurrences of patterns as a function of time along the x-axis. In particular, individual occurrences are represented schematically as vertical lines 606, 607, 608, 609. Each row of occurrences can be instances where activity matches a respective pattern or class of pattern. For example, the top row of occurrences can be instances where activity matches pattern 405 (FIG. 2), the second row of occurrences can be instances where activity matches pattern 410 (FIG. 2), the third row of occurrences can be instances where activity matches pattern 415 (FIG. 2), and so on.

Graph 605 also includes dashed rectangles 615, 620, 625 that schematically delineate different windows of time when the activity patterns have a distinguishable complexity. As shown, the likelihood that activity in the recurrent artificial neural network matches a pattern indicative of complexity is higher during the windows delineated by dashed rectangles 615, 620, 625 than outside those windows.

Graph 610 represents the complexity associated with these occurrences as a function of time along the x-axis. Graph 610 includes a first peak 630 in complexity that coincides with the window delineated by dashed rectangle 615 and a second peak 635 in complexity that coincides with the window delineated by dashed rectangles 620, 625. As shown, the complexity represented by peaks 630, 635 is distinguishable from what can be considered to be a baseline level 640 of complexity.

In some implementations, the times at which the output of a recurrent artificial neural network is to be read coincide with the occurrences of activity patterns that have a distinguishable complexity. For example, in the illustrative context of FIG. 4, the output of a recurrent artificial neural network can be read at peaks 630, 635, i.e., during the windows delineated by dashed rectangles 615, 620, 625.

In some implementations, not only the content but also the timing of the activity patterns that have a distinguishable complexity can be output from the recurrent artificial neural network. In particular, not only the identity and activity of the nodes that participate in activity that comports with the activity patterns, but also the timing of the activity patterns can be considered the output of the recurrent artificial neural network. The identified activity patterns as well as the timing when this decision is to be read can thus represent the result of processing by the neural network.

Figure 5:
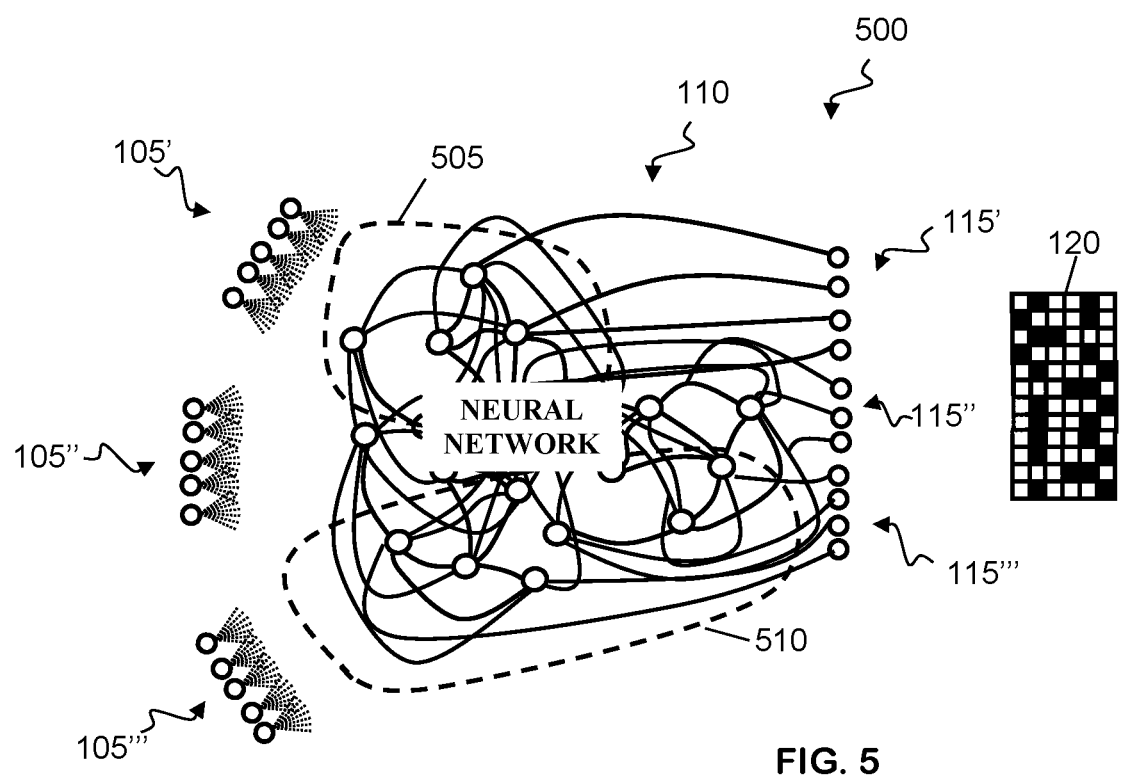
FIG. 5 is a schematic representation of an approach for inputting data that originates from different sensors into neural network and processing the input data.

FIG. 5 is a schematic representation of an approach for inputting data 50 that originates from different sensors into neural network 110 and processing the input data. In the illustrated implementation, different subsets 105', 105", 105''' of network inputs 105 are dedicated to receiving different types of input data. For example, a first subset 105' can be dedicated to receiving a first class of input data (e.g., data that originates from a first sensor) whereas a second subset 105" can be dedicated to receiving a second class of input data (e.g., data that originates from a second sensor).

In some implementations, corresponding "regions" 505, 510 of neural network 110 receive different classes of input data from different subsets 105', 105", 105''' of network inputs 105. For example, in the schematic illustration, regions 505, 510 are shown spatially discrete collections of nodes and edges with relatively few node-to-node connections between each region. This is not necessarily the case. Rather, the nodes and edges of each region 505, 510 can be spatially distributed within neural network 110 but yet receive a particular class of input data.

Regardless the distribution of the nodes in each region 505, 510, the processing in each region 505, 510 is primarily—but not necessarily exclusively—perturbed by the respectively received class of input data. The extent of perturbation can be measured based on the activity that occurs in a region with and without the respective class of input data being present. For example, a region that is primarily perturbed by a first class of input data may respond to the first class of input data in generally the same manner regardless of whether other classes of input data perturb network 110 at the same time. The processing and abstractions performed by each region 505, 510 are primarily influenced by the received class of input data. Nevertheless, the topological patterns of activity that arise in each region 505, 510 can be read as a digit collection 120. The same is true for other regions of recurrent neural network 110.

This schematically represented in neural network system 500 by separately designating different subsets 115', 115", 115''' of network outputs 115. In particular, subset 115' can be dedicated to outputting digits that represent topological patterns of activity that arise in region 505 of neural network 110, whereas subset 115''' can be dedicated to outputting digits that represent topological patterns of activity that arise in region 5100 of neural network 110. However, subset 115" outputs digits that are not found in either of regions 505, 510. Indeed, the digits that are output in subset 115" may represent a fusion or further abstraction of the abstract representations and processing results that arise in regions 505, 510 to a higher level of complexity.

For example, a given digit in subset 115" may arise if and only if both one or more digits in subset 115' and one or more digit in subset 115''' have certain values. The digit in subset 115" can thus represent an arbitrarily higher level abstraction-both of the abstractions generated in regions 655, 660 but also of the input data itself.

When different regions are primarily perturbed by a single class of input data, the processing in those regions can be tailored to the nature of the input data. For example, the depth of connection and the topology of network loops can be tailored to the input data. In recurrent neural networks that are modelled on biological systems, neuronal dynamics and synaptic plasticity can also be tailored to the input data. The tailoring, e.g., capture different time scales. For example, the processing in a region that is tailored to processing classes of input data that changes relatively rapidly (e.g., video or audio data) can be faster than the processing in a region that is tailored to processing classes of input data that changes relatively slowly or not at all.

Further, when different regions of a recurrent neural network are primarily perturbed by a single class of input data, it is easier for humans to attribute the representations that arise in a recurrent neural network to particular input data. The representations that arise in a particular region can be attributed to the class of input data that primarily perturbs that region. Once the representations that arise in a particular region are attributed, higher level and more complex abstractions that arise in response to the representations in a particular region can also be more easily understood.

Also, training can be targeted to portions of a recurrent neural network that are not primarily perturbed by a single class of input data, i.e., targeted to the portions of a recurrent neural network that fuse the processing results of regions that are primarily perturbed by a single class of input data. In effect, the regions that are primarily perturbed by a single class of input data will generate representations of the input data that are universal—not only for output from the recurrent neural network but also for further abstraction and other operations with the recurrent neural network.

Figure 6:
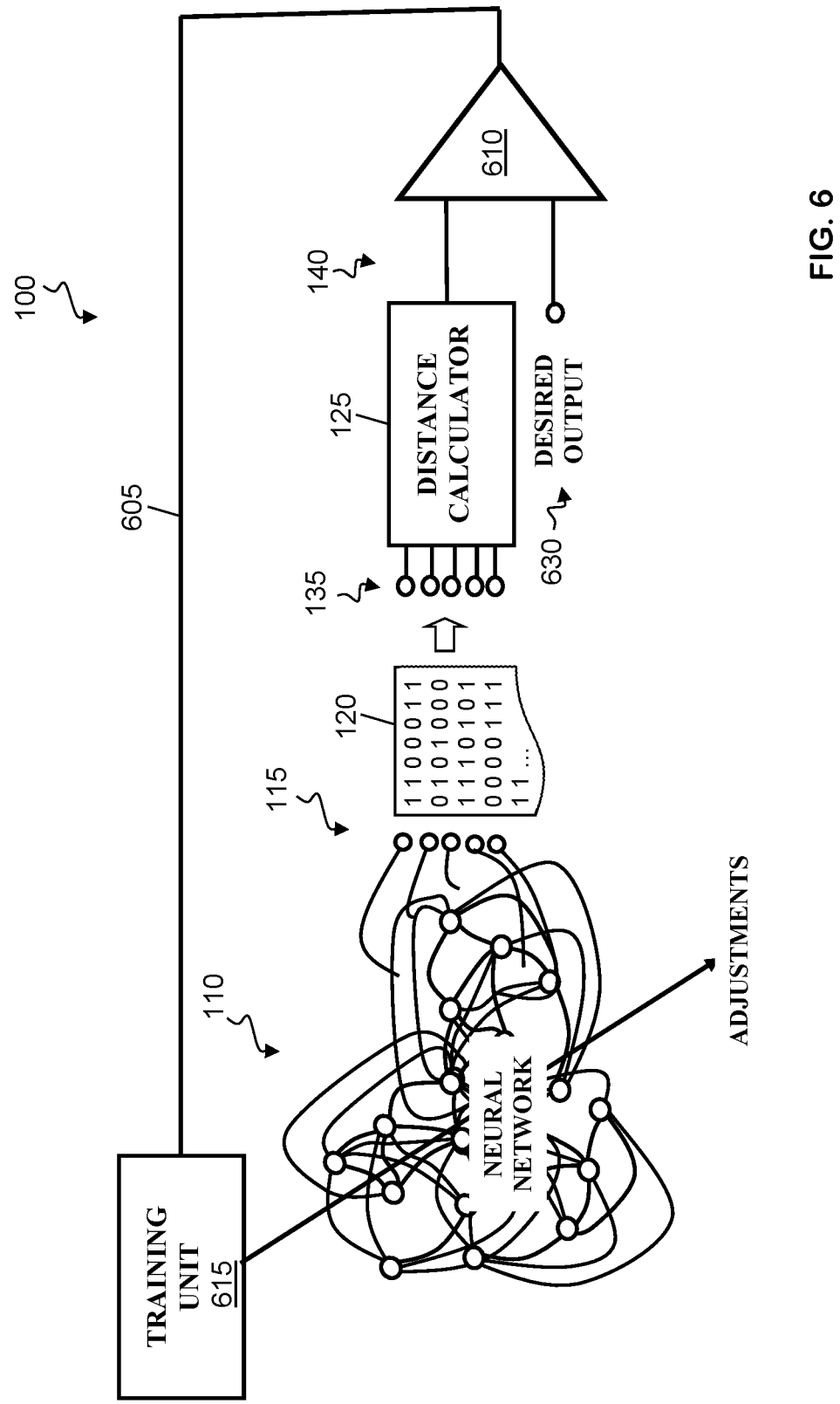
FIG. 6 is a schematic representation of how a recurrent neural network can be trained to produce a collection of digits that is tailored to achieve desirable distance metrics in a particular context.

FIG. 6 is a schematic representation of how a recurrent neural network 110 can be trained to produce a collection of digits 120 that is tailored to achieve desirable distance metrics in a particular context.

For example, the digits can be tailored based on the type of input that is going to be received by neural network 110. The tailoring can, e.g., ensure that neural network 110 is sufficiently sensitive to certain differences in different input data and/or sufficiently insensitive to other differences in the input data. In effect, the digits can be tailored to ensure that different collections of digits 120 are sufficiently close or distant from one another (e.g., that the "crowding distance" between different collections of digits 120 is desirable).

In addition to recurrent neural network 110 and distance calculator 125, the illustrated implementation of neural network system 100 also includes a comparator 610 and a training unit 615.

Comparator 610 is a device that is configured to compare the distance metric output 140 by distance calculator 125 with a desired output 630. The comparison can yield a cost function or other measure of how close the distance metric output 140 is to the desired output 630.

Training unit 615 is a device that is configured to alter one or more attributes of recurrent neural network 110 based on a measure of how close the distance metric output 140 is to the desired output 630 to reduce the differences therebetween. For example, training unit 615 can add or remove either nodes or links from neural network 110, change the weights of links, change the topological patterns that are represented in digit collection 120, or other modify recurrent neural network 110. In implementations where recurrent neural network 110 is a relatively complex neural network that is modelled on a biological system, training unit 615 can alter, e.g., morphological, chemical, or other characteristics of the model.

The training of recurrent neural network 110 to produce a collection of digits 120 that produces desirable distance metrics can be beneficial in a variety of different contexts. For example, as discussed above, neural network 110 can be trained to achieve a desirable sensitivity to certain characteristics of the input data. Such tailoring can be performed, e.g., to improve the adversarial resistance of neural network 110 by making neural network 110 insensitive to adversarial attack. As another example, such tailoring can be performed to ensure that neural network 110 clusters input data into a desirable number of clusters. As yet another example, such tailoring can be performed to ensure that digit collection 120 includes digits that are relevant for particular downstream processes such as, e.g., classification or other supervised learning applications. As yet another example, such tailoring can be performed to adapt activity thresholds in neural network 110. For example, thresholds can be adapted based on the amount of "noise" in the environment, where the noise is input data that potentially contributes to the activity level in neural network 110. By adapting the thresholds, neural network 110 can be made insensitive to the noise.

Figure 7:
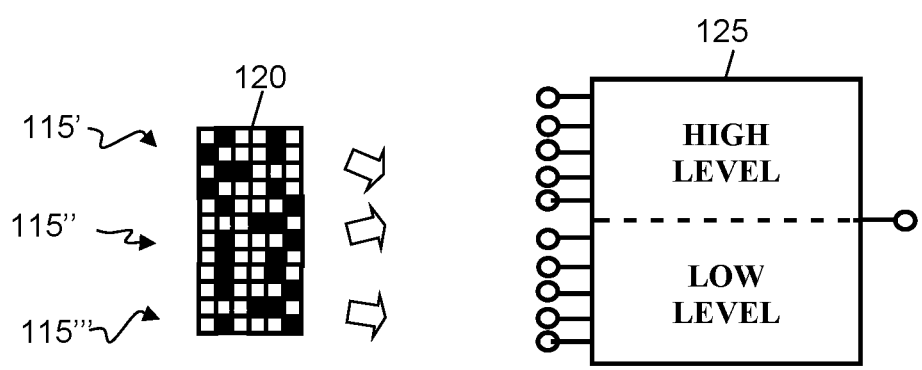
FIG. 7 is a schematic representation of a calculation of a distance metric using a collection of digits that each represent the presence or absence of a respective topological pattern of activity in recurrent neural network Like reference symbols in the various drawings indicate like elements.

FIG. 7 is a schematic representation of a calculation of a distance metric using a collection of digits 120 that each represent the presence or absence of a respective topological pattern of activity in recurrent neural network 110. As shown, digit collection 120 includes digits that have originated from different subsets 115', 115", 115'" of network outputs 115 recurrent neural network 110 that are dedicated to outputting representations that arise in different regions, such as regions 505, 510, 515 (FIG. 5). As in FIG. 5, subsets 115' and 115'" can be dedicated to outputting representations of relatively "low level" abstractions whereas subsets 115" can be dedicated to outputting representations of relatively "high level" abstractions.

As represented schematically by the dashed line, a distance calculator 125 can treat the low level abstractions and the high level abstractions differently during calculation of a distance metric. The different treatment can be implemented in a variety of different ways. For example, higher level abstractions can be weighted more heavily than lower level abstractions. As another example, a first distance calculation may be used for low level abstractions whereas a second for high level abstractions. As another example, the calculation of a distance metric can proceed in a multi-step process. For example, in a first step, high level abstractions can be used in a first process, whereas the low level abstractions can be used in a second process. Indeed, the weights or other parameters used in the calculation of the distance metric for the low level abstractions can be adjusted on the distance calculated for the high level abstractions in the first process.

In this way, not only can a single recurrent neural network produce different levels of abstraction, but the calculation of a distance metric can accommodate those different levels by treating different levels of abstraction differently. This can lead to new approaches to calculating distance metrics that can handle even high-dimensionality data.

Treating different levels of abstraction differently can beneficial in a number of contexts. For example, different levels of abstraction can be used for preclustering large amounts of data or incremental/progressive clustering in which clustering starts with coarse unrefined clusters that are gradually improved in successive operations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

What is claimed is:

1. A method comprising:
   determining a distance between first data and either second data or a reference using information that identifies topological patterns of activity that occur in response to an input of the first data into a recurrent neural network, wherein the distance is determined using a distance metric that treats a first subset of the topological patterns of activity differently from a second subset of the topological patterns of activity; and
   clustering the first data based on the determined distances.

2. The method of claim 1, wherein the distance is determined between the first data and either a centroid of a cluster or a cluster boundary of the second data.

3. The method of claim 1, wherein:
   the occurrence of the topological patterns of activity is represented in a collection of binary or multivalued digits that each indicate whether a respective topological pattern occurred or not.

4. The method of claim 1, wherein clustering the first data based on the determined distances comprises clustering the first subset of the topological patterns of activity and the second subset of the topological patterns of activity at different levels of cluster refinement.

5. The method of claim 1, wherein the distance metric weighs the first subset of the topological patterns as more strongly indicative of distance than the second subset of topological patterns.

6. The method of claim 1, wherein:
   the first data and the second data include multiple classes of input data; and
   the first subset of the topological patterns only includes topological patterns that arise in a region of the recurrent neural network that is primarily perturbed by a single class of the input data.

7. The method of claim 6, wherein:
   each of the multiple classes of input data originates from a different sensor; and
   the single class of input data originates only from a first of the sensors.

8. The method of claim 1, wherein:
   the recurrent neural network is trained; and
   the second subset of the topological patterns only includes topological patterns that arise in a region of the recurrent neural network that reflects the training.

9. The method of claim 1, wherein the recurrent neural network is untrained.

10. The method of claim 1, wherein a complexity of the topological patterns in the second subset of the topological patterns is higher than a complexity of the topological patterns in the first subset.

11. The method of claim 1, wherein at least some of the topological patterns in the first subset are included in the topological patterns in the second subset.

12. The method of claim 1, further comprising:
    repeatedly determining a distance between data inputs using information that identifies topological patterns of activity; and
    progressively clustering the data inputs based on the determined distances.

13. The method of claim 12, wherein the progressive clustering increases cluster refinement in successive repetitions.

14. The method of claim 13, wherein a coarseness of clustered data inputs improves in successive repetitions.

15. At least one non-transitory computer-readable storage medium encoded with executable instructions that, when executed by at least one processor, cause the at least one processor to perform operations comprising:
    determining a distance between first data and either second data or a reference using information that identifies topological patterns of activity that occur in response to an input of the first data into a recurrent neural network, wherein the distance is determined using a distance metric that treats a first subset of the topological patterns of activity differently from a second subset of the topological patterns of activity; and
    clustering the first data based on the determined distances.

16. The non-transitory computer-readable storage medium of claim 15, wherein clustering the first data based on the determined distances comprises clustering the first subset of the topological patterns of activity and the second subset of the topological patterns of activity at different levels of cluster refinement.

17. A system comprising one or more computers and one or more storage devices storing instructions that are operable, when executed by the one or more computers, to cause the one or more computers to perform operations comprising:
    determining a distance between first data and either second data or a reference using information that identifies topological patterns of activity that occur in response to an input of the first data into a recurrent neural network, wherein the distance is determined using a distance metric that treats a first subset of the topological patterns of activity differently from a second subset of the topological patterns of activity; and
    clustering the first data based on the determined distances.

18. The system of claim 17, wherein:
    clustering the first data based on the determined distances comprises clustering the first subset of the topological patterns of activity and the second subset of the topological patterns of activity at different levels of cluster refinement.

* * * * *